United States Patent
Okitsu

(10) Patent No.: US 11,852,919 B1
(45) Date of Patent: Dec. 26, 2023

(54) BACKLIGHT UNIT AND DISPLAY DEVICE

(71) Applicant: Sharp Display Technology Corporation, Kameyama (JP)

(72) Inventor: Motoaki Okitsu, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/219,132

(22) Filed: Jul. 7, 2023

Related U.S. Application Data

(60) Provisional application No. 63/388,456, filed on Jul. 12, 2022.

(51) Int. Cl.
*G02F 1/13357* (2006.01)
*G02F 1/1333* (2006.01)

(52) U.S. Cl.
CPC .. *G02F 1/133603* (2013.01); *G02F 1/133382* (2013.01); *G02F 1/133608* (2013.01)

(58) Field of Classification Search
CPC ......... G02F 1/133603; G02F 1/133382; G02F 1/133608
See application file for complete search history.

(56) References Cited

FOREIGN PATENT DOCUMENTS

JP    H11-251496 A    9/1999

OTHER PUBLICATIONS

WO-2012157344-A1, Kikuchi, Nov. 2012 (Year: 2012).*
WO-2015060272-A1, Fuchikawa, Apr. 2015 (Year: 2015).*

* cited by examiner

*Primary Examiner* — Mary Ellen Bowman
(74) *Attorney, Agent, or Firm* — ScienBiziP, P.C.

(57) ABSTRACT

A backlight unit includes an LED substrate including a first main surface and a second main surface on a side opposite to the first main surface, a plurality of LED elements arranged on the first main surface, one or more drive IC elements arranged on the second main surface, a chassis disposed on the second main surface side of the LED substrate, and one or more IC element covers each being in direct or indirect contact with a corresponding drive IC element of the one or more drive IC elements. The chassis includes one or more protrusions respectively corresponding to the one or more drive IC elements. Each of the one or more protrusions includes an opening that exposes the corresponding drive IC element when viewed from a normal direction of the second main surface. The IC element cover fits in the protrusion.

15 Claims, 21 Drawing Sheets

BACKLIGHT UNIT AND DISPLAY DEVICE

CROSS-REFERENCE TO RELATED APPLICATIONS

This application claims the benefit of priority to U.S. Provisional Application No. 63/388,456 filed on Jul. 12, 2022. The entire contents of the above-identified application are hereby incorporated by reference.

BACKGROUND

Technical Field

The disclosure relates to a backlight unit of a display device such as a liquid crystal display device, and a display device including such a backlight unit.

A liquid crystal display device including a backlight unit using a plurality of LED elements is widely used. In the related art, cooling of a drive IC element for driving an LED element has often been performed by using a heat sink as described in, for example, JP H11-251496 A. Further, in the related art, in addition to an LED substrate installed with a plurality of LED elements, a drive substrate installed with a plurality of drive IC elements for driving the LED elements has often been prepared and connected by a wiring line. However, in recent years, a driver on board (DOB) configuration installed with a drive IC element on a back surface of the LED substrate has been developed in order to reduce the thickness of a backlight device.

SUMMARY

However, there is also a problem in that the heat sink is relatively expensive and also bulky. Further, in the DOB configuration, a heat radiation structure in which entry of dust and light leakage do not occur is desired.

An object of the disclosure is to provide a backlight unit having a structure that can efficiently cool a drive IC element while reducing entry of dust and light leakage in a backlight unit having a DOB configuration, and a display device including such a backlight unit.

According to embodiments of the disclosure, solutions described in the following items are provided.

Item 1
  A backlight unit including
   an LED substrate including a first main surface and a second main surface on a side opposite to the first main surface,
   a plurality of LED elements arranged on the first main surface,
   one or more drive IC elements arranged on the second main surface,
   a chassis disposed on the second main surface side of the LED substrate, and
   one or more IC element covers each being in direct or indirect contact with a corresponding one of the one or more drive IC elements,
   in which the chassis includes one or more protrusions respectively corresponding to the one or more drive IC elements,
   each of the one or more protrusions includes an opening exposing the corresponding drive IC element when viewed from a normal direction of the second main surface, and
   the IC element cover fits in the protrusion.

Item 2
  The backlight unit according to item 1,
   in which the IC element cover includes a recessed portion into which the protrusion fits.

Item 3
  The backlight unit according to item 1,
   in which the IC element cover includes a protruding portion fitting into the opening included in the protrusion.

Item 4
  The backlight unit according to item 3,
   in which the protruding portion has a hollow square shape when viewed from the normal direction of the second main surface.

Item 5
  The backlight unit according to item 3,
   in which the protruding portion has a substantially rectangular shape when viewed from the normal direction of the second main surface.

Item 6
  The backlight unit according to any of items 1 to 5,
   in which the IC element cover is larger than the protrusion when viewed from the normal direction of the second main surface.

Item 7
  The backlight unit according to any of items 1 to 6,
   in which the IC element cover includes an extending portion extending in a direction substantially perpendicular to the second main surface.

Item 8
  The backlight unit according to any of items 1 to 7, further including
   a heat radiation sheet disposed between the drive IC element and the IC element cover.

Item 9
  The backlight unit according to any of items 1 to 8, further includes
   a heat insulation sheet disposed between the chassis and the IC element cover.

Item 10
  The backlight unit according to item 9,
   in which the heat insulation sheet is a double-sided adhesive sheet.

Item 11
  The backlight unit according to any of items 1 to 10,
   in which the chassis and the IC element cover are fixed to each other by a screw.

Item 12
  The backlight unit according to any of items 1 to 11,
   in which the protrusion is formed by drawing processing.

Item 13
  The backlight unit according to any of items 1 to 11,
   in which the protrusion is formed by half-punch processing.

Item 14
  The backlight unit according to any of items 3 to 5,
   in which the protruding portion is formed by half-punch processing.

Item 15
  A display device including
   the backlight unit according to any of items 1 to 14, and
   a display panel disposed on the first main surface side of the LED substrate.

According to embodiments of the disclosure, a backlight unit that has a DOB configuration and that can efficiently cool a drive IC element while reducing entry of dust and light leakage, and a display device including such a backlight unit are provided.

BRIEF DESCRIPTION OF DRAWINGS

The disclosure will be described with reference to the accompanying drawings, wherein like numbers reference like elements.

DESCRIPTION OF EMBODIMENTS

Figure 1:
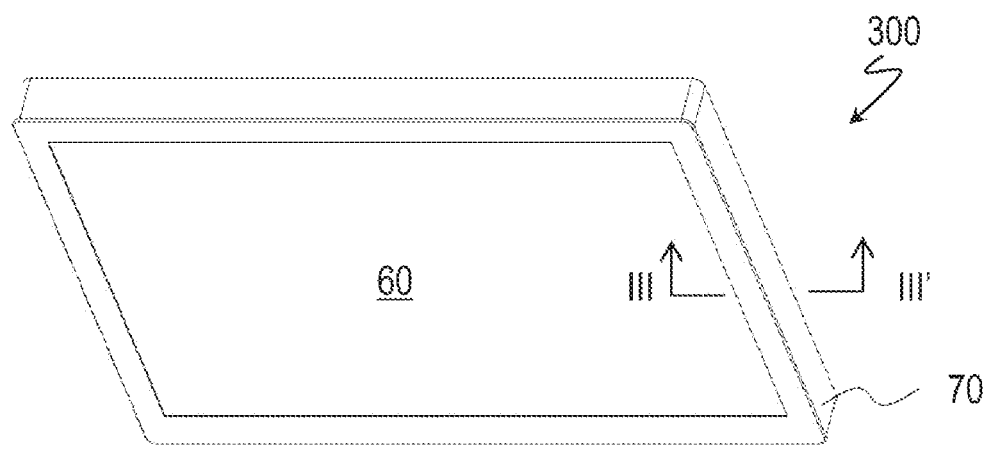
FIG. 1 is a schematic perspective view of a liquid crystal display device 300 including a backlight unit 100 according to an embodiment of the disclosure.

Hereinafter, a backlight unit and a display device according to embodiments of the disclosure will be described. Here, the backlight unit according to the embodiments of the disclosure will be described by taking, as an example, a backlight unit used in a liquid crystal display device. However, the backlight unit and the display device according to the embodiments of the disclosure are not limited to the exemplification. The backlight unit according to the embodiments of the disclosure can also be used in, for example, a display device including a transmission-type display panel other than a liquid crystal display panel.

The backlight unit according to the embodiments of the disclosure includes an LED substrate, a plurality of LED elements, one or more drive IC elements (a plurality of drive IC elements in the following examples), a chassis, and one or more IC element covers (a plurality of IC element covers in the following examples). The LED substrate includes a first main surface and a second main surface opposite to the first main surface, the plurality of LED elements are arranged on the first main surface, and the one or more drive IC elements are arranged on the second main surface. The chassis is disposed on the second main surface side of the LED substrate. Each of the one or more IC element covers is disposed so as to be in direct or indirect contact with a corresponding drive IC element of the one or more drive IC elements. The chassis includes one or more protrusions (a plurality of protrusions in the following examples) respectively corresponding to the one or more drive IC elements and each defining an outer edge of a space around the corresponding drive IC element, and each of the one or more protrusions includes an opening that exposes the corresponding drive IC element when viewed from a normal direction of a second main surface of an LED substrate 20.

The IC element cover fits in the protrusion of the chassis. The IC element cover may include a recessed portion into which the protrusion of the chassis fits, or may include a protruding portion that fits into the opening included in the protrusion of the chassis. The drive IC element is housed in a space formed by the second main surface of the LED substrate 20, the protrusion of the chassis, and the IC element cover in which the protrusion fits. The space formed by the second main surface of the LED substrate 20, the protrusion of the chassis, and the IC element cover in which the protrusion fits has a sealing property of a degree such that dust does not enter the space. The chassis and the IC element cover are formed of a metal material having high thermal conductivity, for example, an aluminum alloy. The protrusion of the chassis may be formed by, for example, drawing processing or half-punch processing. Further, the protruding portion of the IC element cover may be formed by, for example, half-punch processing. The drive IC element and the IC element cover may be in direct contact with each other, or may be in indirect contact with each other via, for example, a heat radiation sheet. Heat of the drive IC element may be transmitted to the IC element cover by contact thermal conduction.

Meanwhile, in order to reduce direct thermal conduction from the chassis to the IC element cover, a heat insulation sheet may be disposed between the chassis and the IC element cover. The chassis and the IC element cover may be fixed by, for example, a screw, or may be fixed by a double-sided adhesive sheet. Of course, the screw and the double-sided adhesive sheet may be used together. The double-sided adhesive sheet may also act as the heat insulation sheet described above.

Hereinafter, the backlight unit and the display device according to the embodiments of the disclosure will be described with reference to the drawings.

Figure 2:
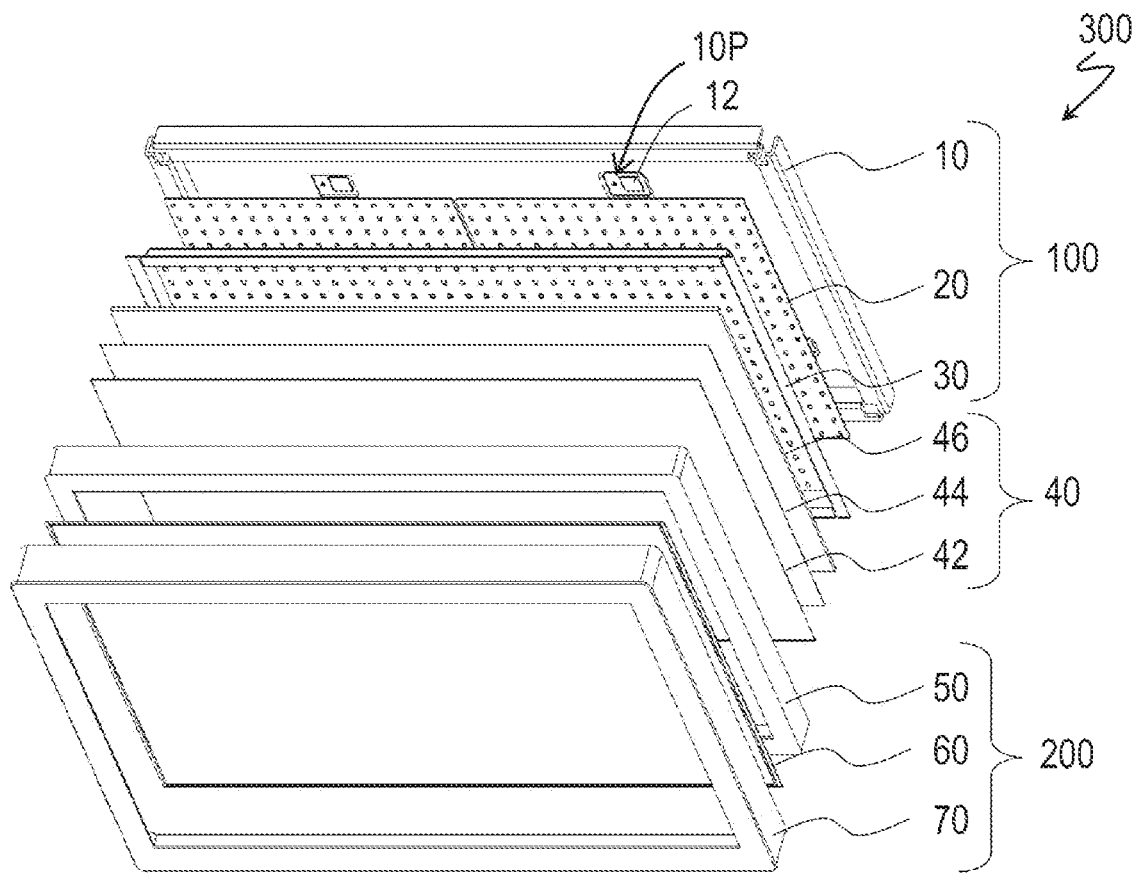
FIG. 2 is a schematic exploded perspective view of the liquid crystal display device 300.

FIG. 1 is a schematic perspective view of a liquid crystal display device 300 including the backlight unit according to the embodiment of the disclosure, and FIG. 2 is an exploded perspective view of the liquid crystal display device 300.

Figure 3:
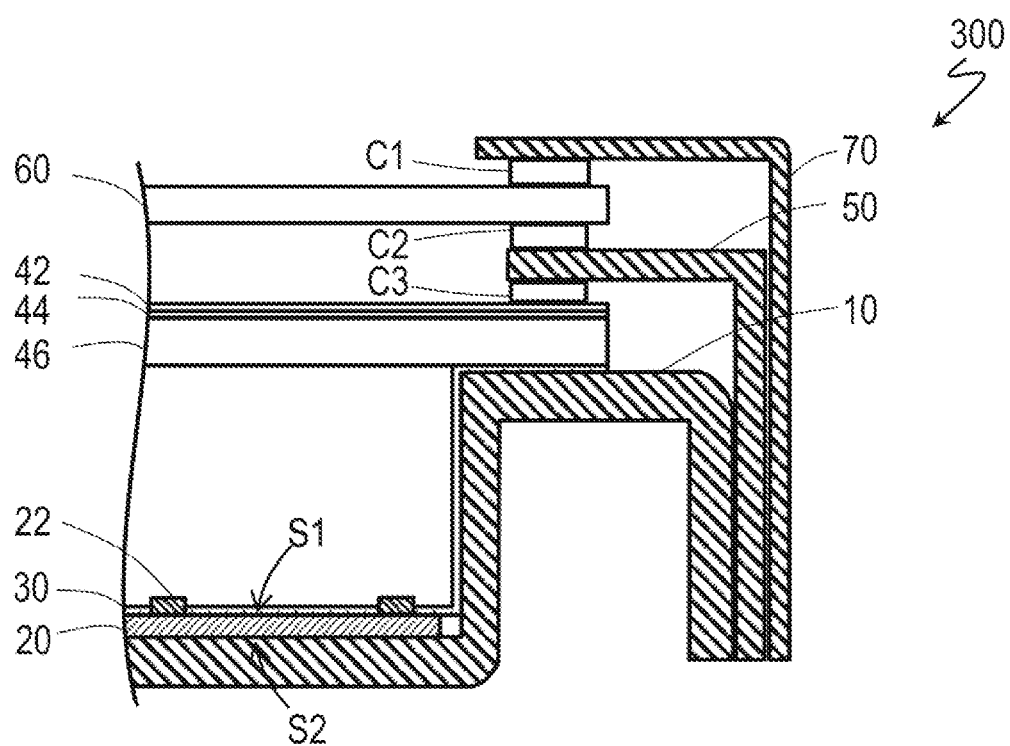
FIG. 3 is a schematic cross-sectional view of the liquid crystal display device 300 taken along a line III-III' in FIG. 1.

Further, FIG. 3 is a schematic cross-sectional view of the liquid crystal display device 300 taken along a line III-III' in FIG. 1.

The liquid crystal display device 300 includes a backlight unit 100, a liquid crystal display panel unit (hereinafter referred to as a display panel unit) 200, and an optical sheet group 40 disposed between the backlight unit 100 and the display panel unit 200.

The backlight unit 100 includes a chassis (backlight chassis) 10, the LED substrate 20, and a reflective sheet 30 disposed on a first main surface side of the LED substrate 20. The reflective sheet 30 has holes that expose a plurality of LED elements 22 disposed on the first main surface of the LED substrate 20, and reflects light emitted from the LED element 22 toward the display panel unit 200 side to improve the usage efficiency of light. Note that the reflective sheet 30 may be omitted.

The display panel unit 200 includes a liquid crystal display panel (hereinafter referred to as a display panel) 60, and a panel chassis 50 and a bezel 70 that are disposed so as to sandwich the display panel 60. Cushion materials C1 and C2 are disposed between the display panel 60 and the bezel 70, and between the display panel 60 and the panel chassis 50, respectively (see FIG. 3). The bezel 70 is disposed so as to cover the display panel 60, the panel chassis 50, the optical sheet group 40, and the backlight unit 100.

The display panel 60 includes a liquid crystal cell including a pair of substrates and a liquid crystal layer provided between the pair of substrates, a polarizer disposed on both sides of the liquid crystal cell, and a phase difference plate provided between the liquid crystal cell and the polarizer on a front surface side as necessary. The pair of substrates included in the liquid crystal cell has a configuration that applies a voltage to the liquid crystal layer. The display panel 60 may be a known transmission-type liquid crystal display panel.

The optical sheet group 40 may include a plurality of optical sheets 42, 44, and 46 according to a configuration of the display panel 60. The optical sheet group 40 includes, for example, the light diffuser sheet (also referred to as a "diffuser plate") 46 and the brightness increase films 44 and 42. Further, the optical sheet group 40 may have a configuration of, for example, a light diffuser sheet/a lens sheet/a lens sheet/a light diffuser sheet. A kind and the number of optical sheets constituting the optical sheet group 40 are not particularly limited. Further, the optical sheet group 40 may be omitted. A cushion material C3 is disposed between the optical sheet group 40 and the panel chassis 50 (see FIG. 3). When the panel chassis 50 is made of a resin, the cushion material C3 may be omitted.

As illustrated in FIG. 2, the chassis 10 includes a plurality of protrusions 10P. A heat radiation sheet 12 may be disposed on each of the protrusions 10P. The heat radiation sheet 12 may be omitted.

A structure of a backlight unit 100A according to the embodiment of the disclosure will be described with reference to FIG. 4 to FIG. 7.

Figure 4:
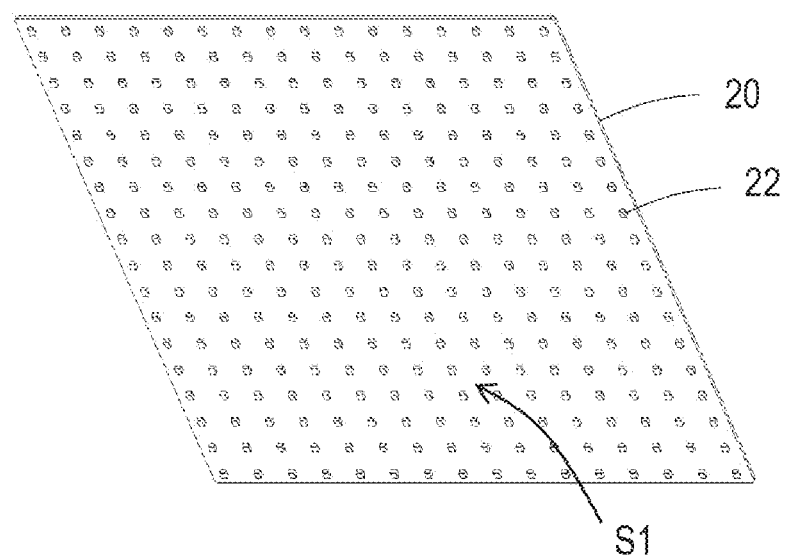
FIG. 4 is a schematic perspective view illustrating a first main surface S1 side of an LED substrate 20.
Figure 5:
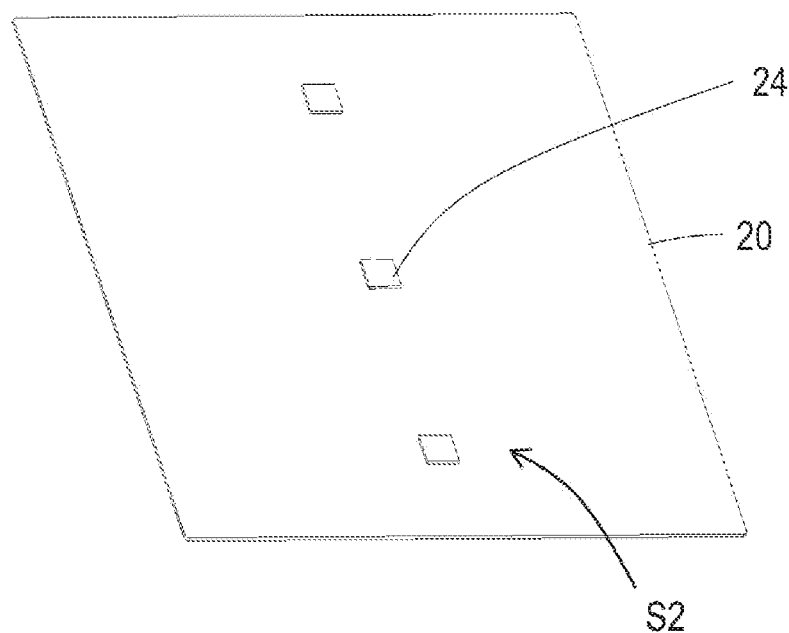
FIG. 5 is a schematic perspective view illustrating a second main surface S2 side of the LED substrate 20.

FIG. 4 is a schematic perspective view illustrating a first main surface S1 side of the LED substrate 20, and FIG. 5 is a schematic perspective view illustrating a second main surface S2 side of the LED substrate 20.

As illustrated in FIG. 4, the plurality of LED elements 22 are disposed on the first main surface S1 of the LED substrate 20. As illustrated in FIG. 5, a plurality of drive IC elements (hereinafter, simply referred to as "IC elements") 24 are disposed on the second main surface S2 of the LED substrate 20. The plurality of IC elements 24 each drive the plurality of LED elements 22. Here, an example in which three IC elements 24 are provided for 96 LED elements 22 is illustrated, which is not limited thereto as a matter of course. The number and an installation position of the IC elements 24 may vary depending on the number and a range of the LED elements 22 controlled by the individual IC element. Further, the LED substrate 20 is provided with a connector (not illustrated) for receiving power supply and/or a signal.

Figure 6:
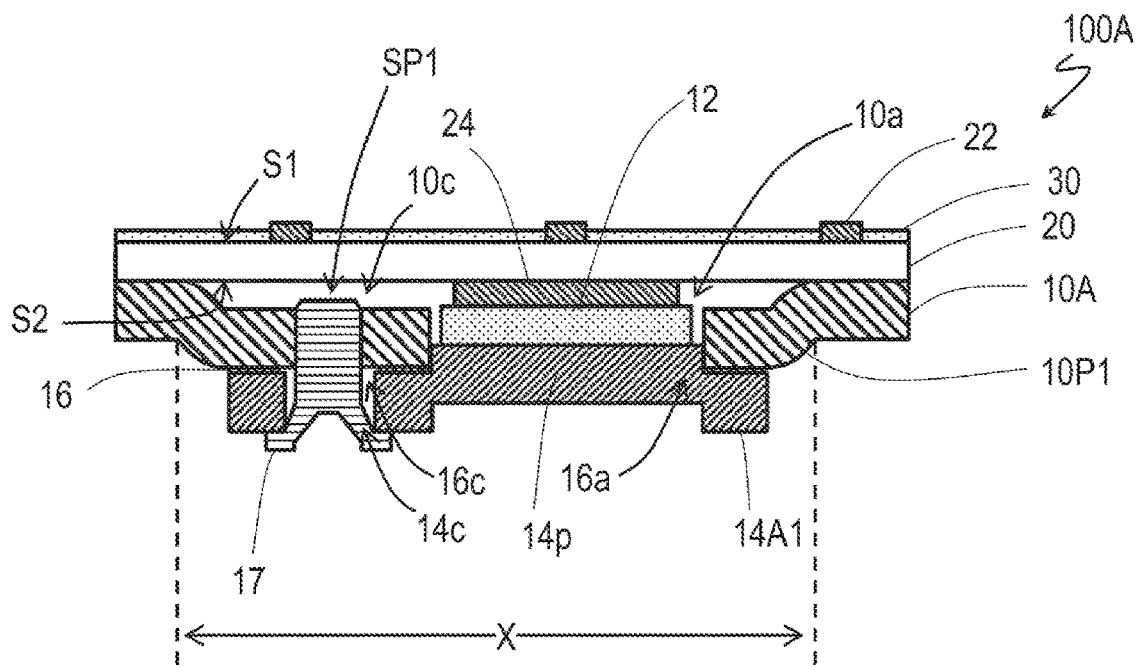
FIG. 6 is a schematic cross-sectional view of a portion including an IC element 24 of a backlight unit 100A according to an embodiment of the disclosure.
Figure 7:
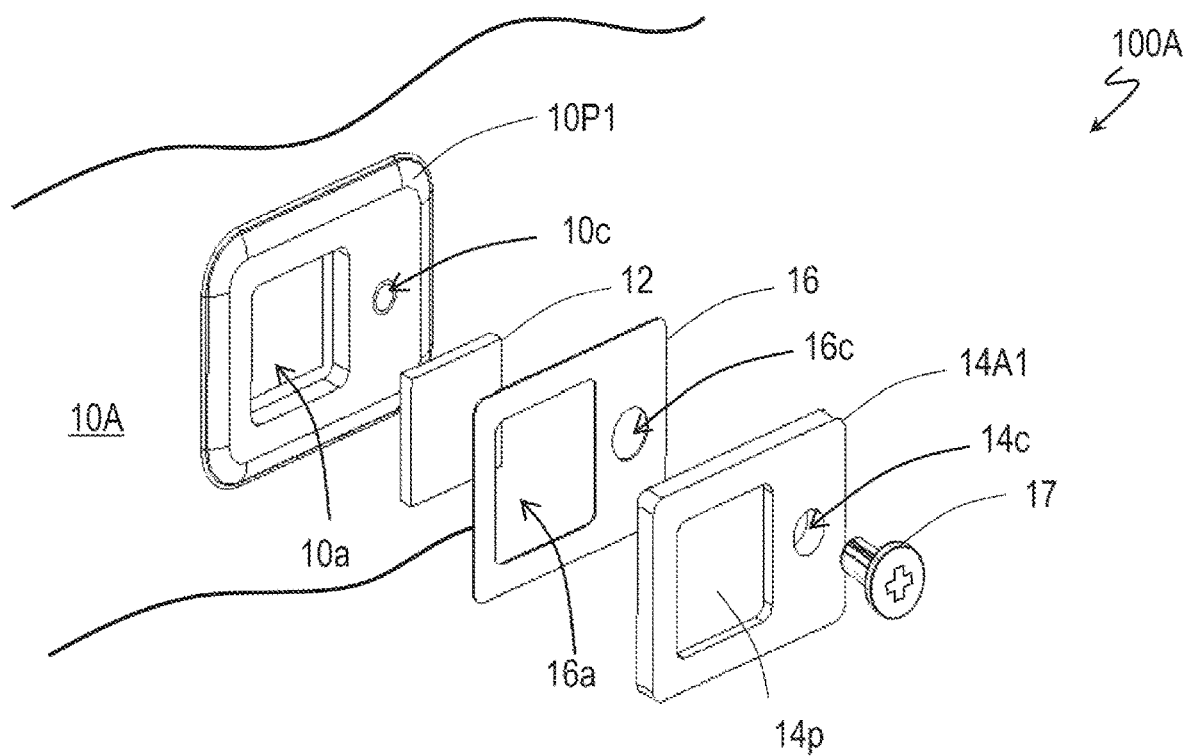
FIG. 7 is a schematic exploded perspective view of a portion including a protrusion 10P1 of a chassis 10A of the backlight unit 100A.

FIG. 6 is a schematic cross-sectional view of a portion including the IC element 24 of the backlight unit 100A, and FIG. 7 is a schematic exploded perspective view of a portion including a protrusion 10P1 of a chassis 10A of the backlight unit 100A.

As illustrated in FIG. 6, the chassis 10A is disposed on the second main surface S2 side of the LED substrate 20. An IC element cover 14A1 is disposed so as to be, via the heat radiation sheet 12, in indirect contact with the IC element 24 disposed on the second main surface S2 of the LED substrate 20. The heat radiation sheet 12 may be omitted, and the IC element cover 14A1 may be disposed so as to be in direct contact with the IC element 24. For example, the IC element cover 14A1 is fixed to a screw hole 10c provided in the protrusion 10P1 of the chassis 10A by a screw 17.

The plurality of protrusions 10P1 included in the chassis 10A each define an outer edge of a space SP1 around a corresponding IC element 24. When viewed from the normal direction of the second main surface S2, each of the protrusions 10P1 includes an opening 10a that exposes the corresponding IC element 24, and the IC element cover 14A1 fits in the protrusion 10P1. The IC element 24 is housed in a space formed by the second main surface S2 of the LED substrate 20, the protrusion 10P1 of the chassis 10A, and the IC element cover 14A1 in which the protrusion 10P1 fits. The protrusion 10P1 of the chassis 10A is formed by, for example, drawing processing, and includes a side surface inclined with respect to the second main surface S2.

The IC element cover 14A1 exemplified herein includes a protruding portion 14p that fits into the opening 10a included in the protrusion 10P1. The protruding portion 14p includes a side surface substantially perpendicular to the second main surface S2, and the protruding portion 14p fits into the opening 10a such that the side surface faces an inner side surface of the opening 10a. The IC element cover 14A1 fits in the protrusion 10P1 by the protruding portion 14p. The protruding portion 14p is formed by, for example, half-punch processing. The IC element cover 14A1 has a relatively simple shape and can be easily manufactured by press working using a mold, and thus a cost can be reduced as compared to a case where a heat sink is used.

A gap of a fitting structure in which the protruding portion 14p of the IC element cover 14A1 fits into the opening 10a of the protrusion 10P1 includes a portion substantially parallel to the second main surface S2 and a portion substantially perpendicular to the second main surface S2, and has a step shape in the cross section illustrated in FIG. 6. Therefore, dust and the like hardly pass through the gap of the fitting structure formed of the protrusion 10P1 and the IC element cover 14A1, and the fitting structure has an excellent dustproof property. In other words, the space formed by the second main surface S2 of the LED substrate 20, the protrusion 10P1 of the chassis 10A, and the IC element cover 14A1 in which the protrusion 10P1 fits has a sealing property of a degree such that dust does not enter the space.

In the backlight unit 100A, the heat radiation sheet 12 is disposed between the IC element 24 and the IC element cover 14A1. The heat radiation sheet 12 is smaller than the opening 10a, and is disposed in the opening 10a. The heat radiation sheet 12 is in contact with the IC element 24 and the IC element cover 14A1, and transmits heat of the IC element 24 to the IC element cover 14A1. The heat radiation sheet 12 may be omitted. When the heat radiation sheet 12 is omitted, the IC element cover 14A1 is configured to be in direct contact with the IC element 24. The IC element cover 14A1 is preferably formed of a metal material (for example, an aluminum alloy) having high thermal conductivity. Further, a heat radiation effect can be improved by devising a shape of the IC element cover 14A1 and increasing a surface area. Heat of the IC element cover 14A1 is dissipated into the air. The IC element cover 14A1 exemplified herein has substantially the same size as a flat upper face of the protrusion 10P. Of course, as exemplified below, various modifications may be made so as to increase the surface area by increasing a size of the IC element cover 14A1 in order to improve a heat radiation property, and the like.

In the backlight unit 100A, a heat insulation sheet 16 is disposed between the chassis 10 (protrusion 10P1) and the IC element cover 14A1. The chassis 10 may also be heated by heat generated from the LED element 22. When heat of the chassis 10 is transmitted to the IC element cover 14A1, heat of the IC element 24 cannot be efficiently dissipated. The heat insulation sheet 16 reduces transmission of heat of the chassis 10 to the IC element cover 14A1. The heat insulation sheet 16 is formed of, for example, a resin (including rubber or an elastomer) having low thermal conductivity.

As illustrated in FIG. 7, the IC element cover 14A1 is attached to the protrusion 10P1 of the chassis 10A. FIG. 7 is the schematic exploded perspective view of the portion including the protrusion 10P1 of the chassis 10A, and a portion other than the protrusion 10P1 of the chassis 10A is omitted in FIG. 7.

The heat radiation sheet 12 is disposed so as to be in contact with the IC element (not illustrated) exposed in the opening 10a of the protrusion 10P1. The heat insulation sheet 16 including an opening 16a and a screw opening 16c is disposed so as to be aligned with the opening 10a and the screw hole 10c of the protrusion 10P1. Next, the IC element cover 14A1 is attached such that the protruding portion 14p fits in the opening 10a. At this time, the IC element cover 14A1 can be easily positioned by using the fitting structure with the opening 10a. The opening 10a and the protruding portion 14p preferably have a substantially rectangular shape (a square with all interior angles being 90°) so as to be aligned with a shape (substantially rectangular shape) of the IC element 24. When the shape is a substantially rectangular shape, an orientation in a plane parallel to the second main surface S2 is also limited as compared to a case of being, for example, a circular shape, and thus positioning can be efficiently performed. Note that the substantially rectangular shape includes, for example, a rectangular shape with rounded four corners.

Next, the screw 17 is passed through a screw opening 14c of the IC element cover 14A1 and the screw opening 16c of the heat insulation sheet 16, the screw 17 is fastened to the screw hole 10c of the protrusion 10P1 of the chassis 10A, and the IC element cover 14A1 is fixed to the protrusion 10P1 of the chassis 10A. One of advantages as compared to a heat sink is also easy removal of the IC element cover 14A1 by using the screw 17.

The number, arrangement density, and input current of the LED elements 22 are determined according to the brightness required for the backlight unit 100A, and vary the amount of heat generated by the LED element 22 and the IC element 24. The heat radiation sheet 12 and/or the heat insulation sheet 16 may be omitted depending on the required heat radiation performance.

Figure 8:
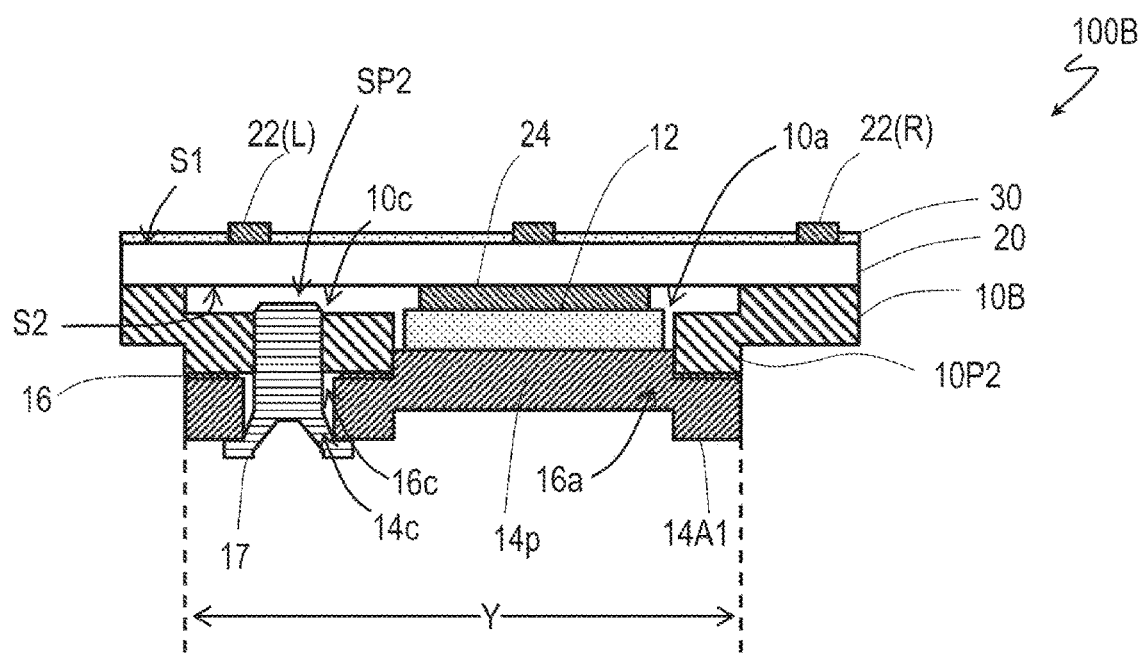
FIG. 8 is a schematic cross-sectional view of a portion including an IC element 24 of a backlight unit 100B according to an embodiment of the disclosure.
Figure 9:
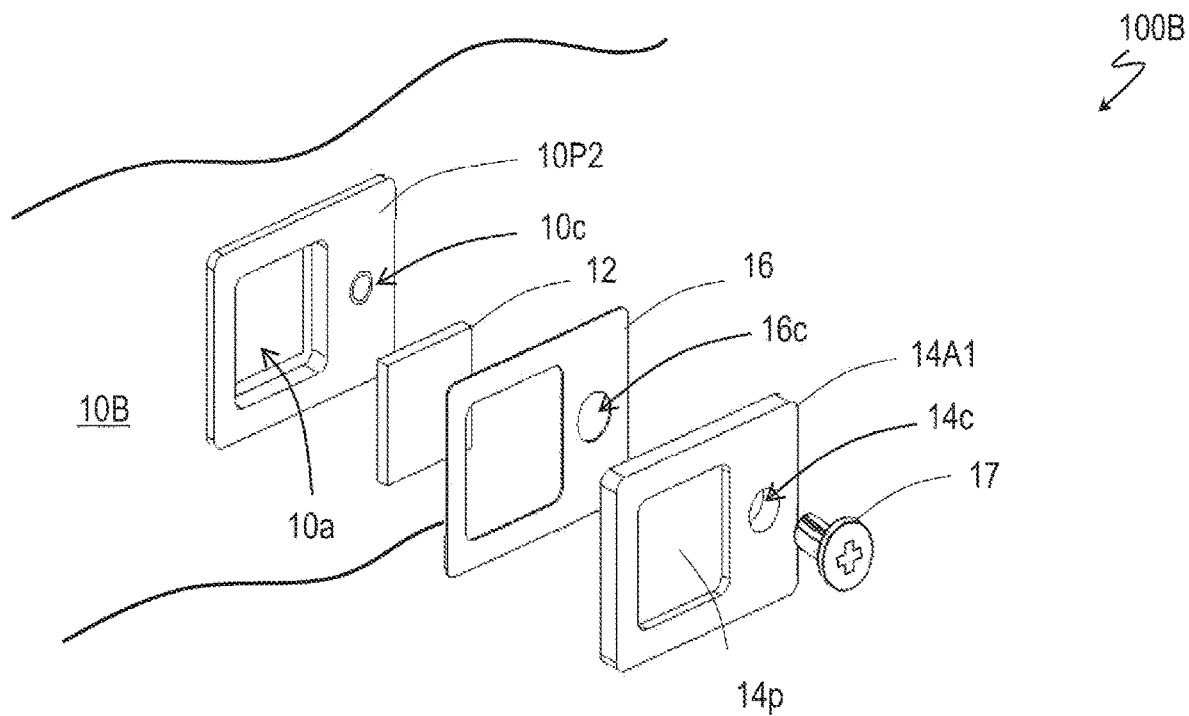
FIG. 9 is a schematic exploded perspective view of a portion including a protrusion 10P2 of a chassis 10B of the backlight unit 100B.

Next, another backlight unit 100B according to the embodiment of the disclosure will be described with reference to FIG. 8 and FIG. 9. FIG. 8 is a schematic cross-sectional view of a portion including the IC element 24 of the backlight unit 100B, and FIG. 9 is a schematic exploded perspective view of a portion including a protrusion 10P2 of a chassis 10B of the backlight unit 100B.

A shape of the protrusion 10P2 included in the chassis 10B of the backlight unit 100B is different from a shape of the protrusion 10P1 included in the chassis 10A of the backlight unit 100A illustrated in FIG. 6 and FIG. 7. In the following drawings, constituent elements having substantially the same functions may be denoted by the same reference signs, and description may be omitted.

The protrusion 10P1 includes the side surface inclined with respect to the second main surface S2, whereas the protrusion 10P2 includes a side surface substantially perpendicular to the second main surface S2. The protrusion 10P2 may be formed by, for example, half-punch processing. Therefore, a width Y of the protrusion 10P2 can be smaller than a width X of the protrusion 10P1. At this time, for example, as exemplified in FIG. 8, a size of the protrusion 10P2 can be substantially equal to the size of the IC element cover 14A1.

In this way, an area of the protrusion 10P2 can be made smaller than an area of the protrusion 10P1. In other words, an area of a space SP2 having an outer edge defined by the protrusion 10P2 can be made smaller than an area of the space SP1 (see FIG. 6) having the outer edge defined by the protrusion 10P1. When the area of the space SP2 is small, the number of LED elements 22 disposed, for example, like the LED element 22 (L) on a left side in FIG. 8 so as to face the space SP2 via the LED substrate 20 can be reduced. The LED element 22 (L) on the left side in FIG. 8 is less likely to radiate heat than the LED element 22 (R) on a right side being in indirect contact with the chassis 10B via the LED substrate 20. Therefore, the number of LED elements 22 disposed like the LED element 22 (L) on the left side in FIG. 8 is preferably small.

As illustrated in FIG. 9, the IC element cover 14A1 is attached to the protrusion 10P2 of the chassis 10B. An attachment procedure is the same as that described with reference to FIG. 7, and thus description will be omitted here.

Note that, depending on the structure of the chassis and the like, half-punch processing may not be able to be performed so as to ensure a space having a sufficient height. For example, when a thickness of an aluminum plate constituting the chassis is small, or when a height of an IC element or an electronic component (for example, a capacitor or a resistor) disposed around the IC element is great, the half-punch processing may not be able to be performed. In such a case, for example, the configuration described with reference to FIG. 6 and FIG. 7 may be adopted by using drawing processing.

Next, a structure of a portion including the IC element 24 in backlight units according to comparative examples will be described with reference to FIG. 10 to FIG. 16.

Figure 10:
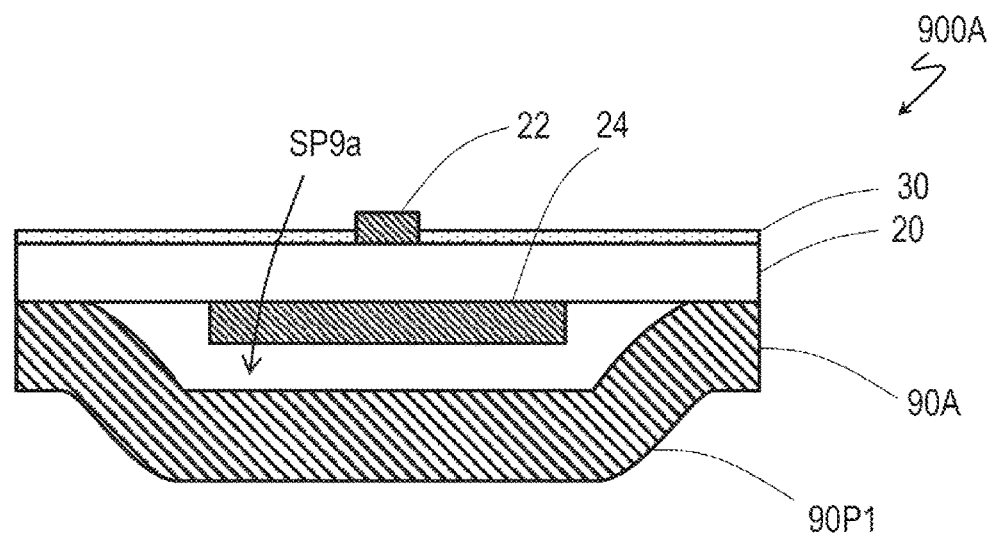
FIG. 10 is a schematic cross-sectional view of a portion including the IC element 24 of a backlight unit 900A according to a comparative example.
Figure 11:
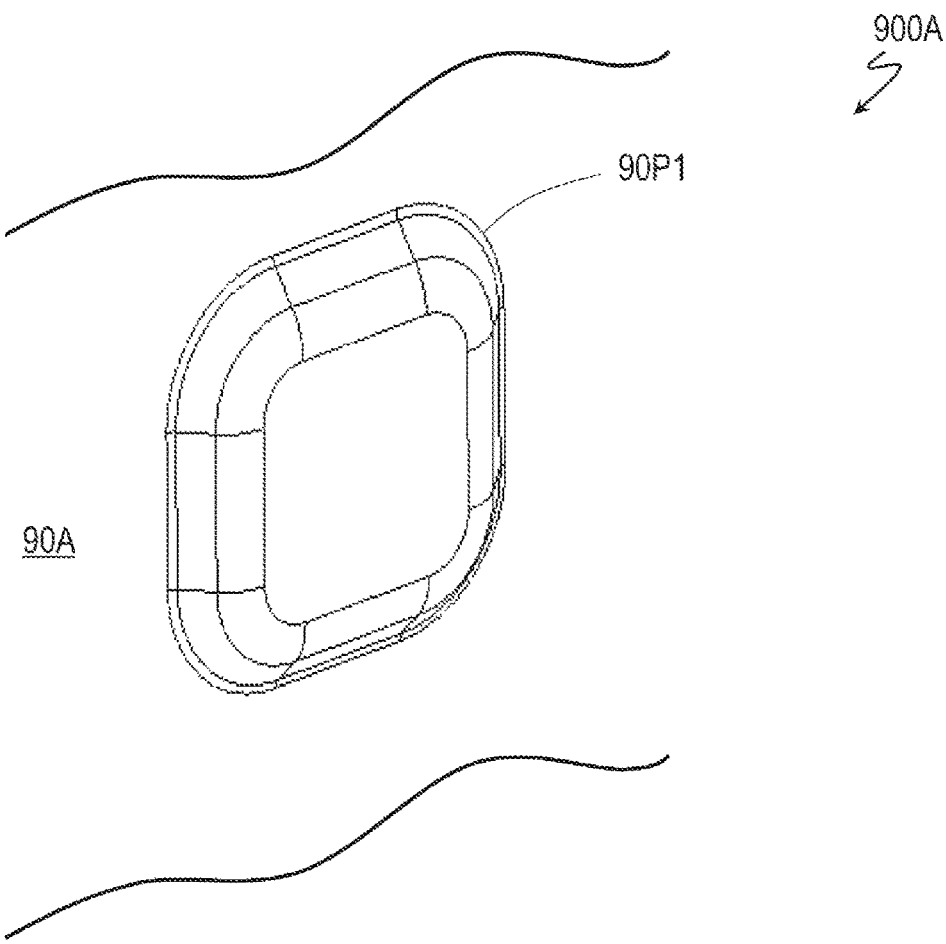
FIG. 11 is a schematic perspective view of a portion including a protrusion 90P1 of a chassis 90A of the backlight unit 900A.

First, a backlight unit 900A according to the comparative example will be described with reference to FIG. 10 and FIG. 11. FIG. 10 is a schematic cross-sectional view of a portion including the IC element 24 of the backlight unit 900A, and FIG. 11 is a schematic perspective view of a portion including a protrusion 90P1 of a chassis 90A. The backlight unit 900A has a simple structure in which the IC element 24 is just covered by the protrusion 90P1 formed on the chassis 90A by drawing processing. By heat generated by the LED element 22, the LED substrate 20 is heated, and the chassis 90A is also heated via the LED substrate 20. Further, since the IC element 24 also generates heat, a space SP9a around the IC element 24 has a temperature higher than an ambient temperature, and there is a risk of the IC element 24 malfunction and the like. In other words, there is a risk of the backlight unit 900A not having sufficient heat radiation characteristics.

Figure 12:
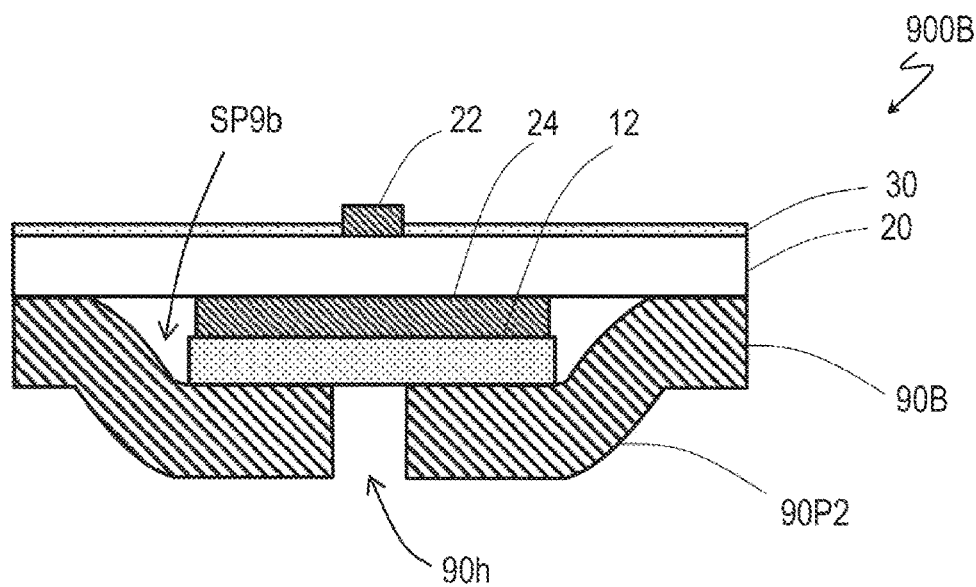
FIG. 12 is a schematic cross-sectional view of a portion including the IC element 24 of a backlight unit 900B according to a comparative example.
Figure 13:
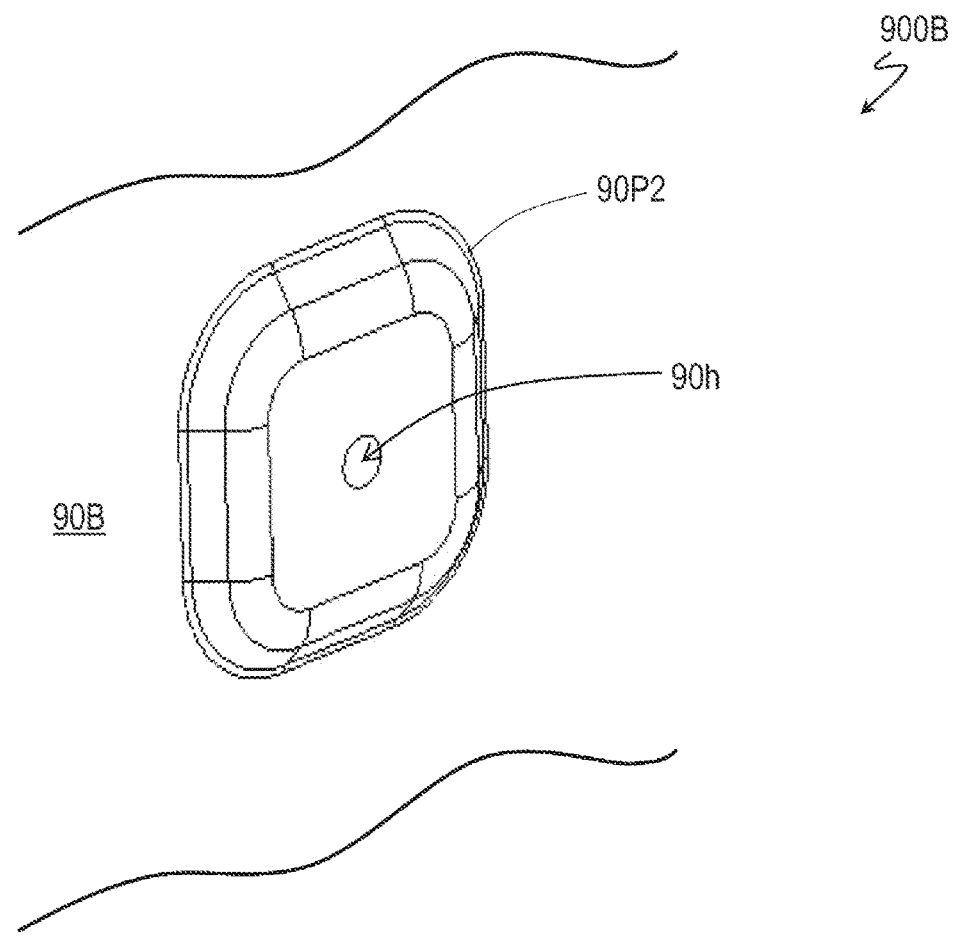
FIG. 13 is a schematic perspective view of a portion including a protrusion 90P2 of a chassis 90B of the backlight unit 900B.

Next, a backlight unit 900B according to the comparative example will be described with reference to FIG. 12 and FIG. 13. FIG. 12 is a schematic cross-sectional view of a portion including the IC element 24 of the backlight unit 900B, and FIG. 13 is a schematic perspective view of a portion including a protrusion 90P2 of a chassis 90B. The backlight unit 900B has a hole 90h in the protrusion 90P2 formed in the chassis 90B by drawing processing. The heat radiation sheet 12 is disposed on the IC element 24 such that the chassis 90B is in indirect contact with the IC element 24 via the heat radiation sheet 12. Although it can be confirmed via the hole 90h that the heat radiation sheet 12 is disposed, in a case where the heat radiation sheet 12 is not properly disposed, the heat radiation sheet 12 cannot be disposed again unless the LED substrate 20 is removed from the chassis 90B. In contrast, in the backlight unit 100A or 100B according to the embodiment of the disclosure described above, the heat radiation sheet 12 can be disposed in a state where the LED substrate 20 is attached to the chassis 10A or 10B.

Figure 14:
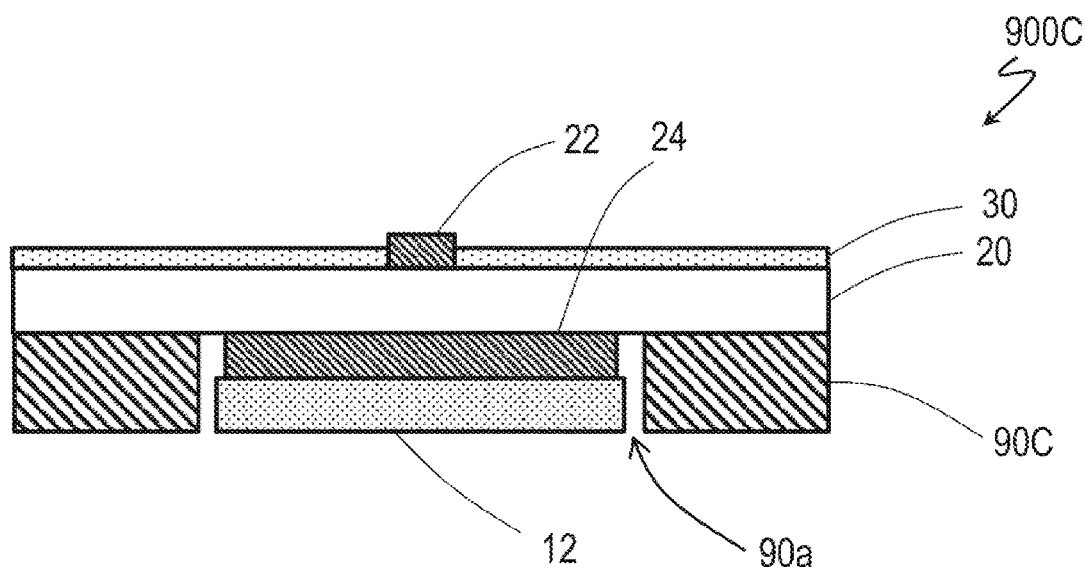
FIG. 14 is a schematic cross-sectional view of a portion including the IC element 24 of a backlight unit 900C according to a comparative example.
Figure 15:
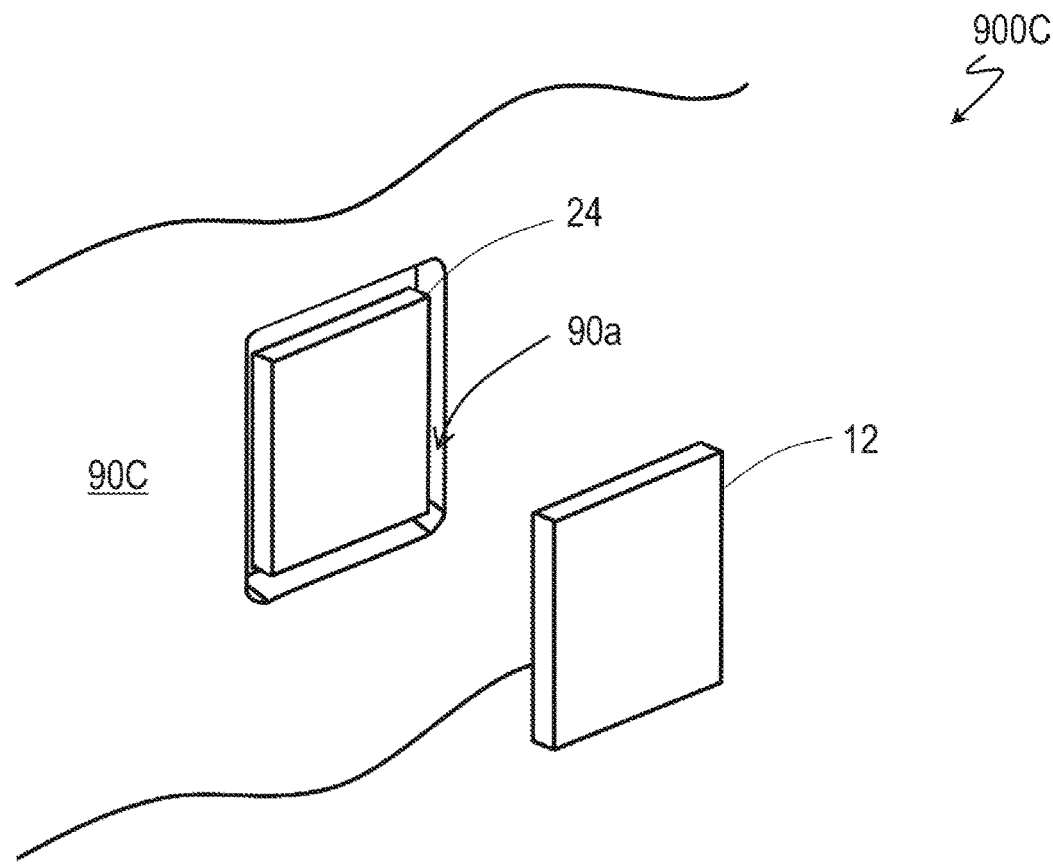
FIG. 15 is a schematic exploded perspective view of a portion including an opening 90a of a chassis 90C of the backlight unit 900C.

Next, a backlight unit 900C according to the comparative example will be described with reference to FIG. 14 and FIG. 15. FIG. 14 is a schematic cross-sectional view of a portion including the IC element 24 of the backlight unit 900C, and FIG. 15 is a schematic exploded perspective view of a portion including an opening 90a of a chassis 90C. The chassis 90C of the backlight unit 900C includes the opening 90a that exposes the IC element 24. In the backlight unit 900C, the heat radiation sheet 12 can be disposed in a state where the LED substrate 20 is attached to the chassis 90C, but with the heat radiation sheet 12 needing to be disposed on the IC element 24 by using an adhesive (including a gluing agent), there is concern about the reliability of the adhesion. Further, there is also a risk of dust entering a gap between the LED substrate 20 and the chassis 90C from the opening 90a. Further, there is also a risk of light leakage occurring from the opening 90a.

Figure 16:
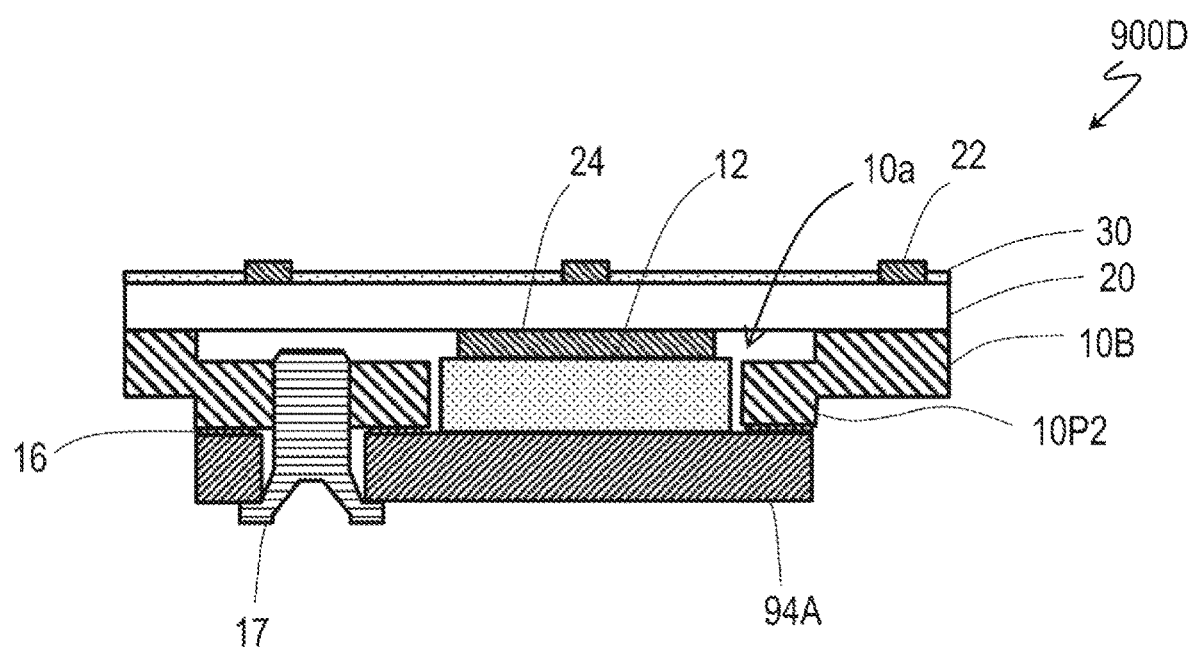
FIG. 16 is a schematic cross-sectional view of a portion including the IC element 24 of a backlight unit 900D according to a comparative example.

Next, a backlight unit 900D according to the comparative example illustrated in FIG. 16 will be described. The backlight unit 900D is different from the backlight unit 100B illustrated in FIG. 8 in a structure of an IC element cover 94A. The IC element cover 14A1 included in the backlight unit 100B includes the protruding portion 14p and has the structure in which the IC element cover 14A1 fits into the opening 10a of the protrusion 10P2 of the chassis 10B, whereas the IC element cover 94A of the backlight unit 900D has a parallel flat plate shape and does not form a fitting structure with the protrusion 10P2 of the chassis 10B. Therefore, when the IC element cover 94A is attached to the chassis 10B, positioning cannot be performed by using the opening 10a, and workability decreases or a structure for positioning needs to be separately provided.

Further, in the backlight unit 100B, the protrusion 10P2 and the protruding portion 14p of the IC element cover 14A1 form the fitting structure, and thus a gap between the protrusion 10P2 and the IC element cover 14A1 has a step shape in the cross section illustrated in FIG. 8. In contrast, in the backlight unit 900D, the protrusion 10P2 and the IC element cover 94A do not form the fitting structure, and thus a gap between the protrusion 10P2 and the IC element cover 94A has a straight shape in the cross section illustrated in FIG. 16, and an effect of reducing the entry of dust is low.

As understood from the comparison with the backlight units 900A to 900D, the backlight units 100A and 100B according to the embodiments of the disclosure have various advantages.

Next, a structure of a backlight unit according to other embodiments of the disclosure will be described. As exemplified below, various modifications may be made to the backlight units 100A and 100B while maintaining the effects described above.

Next, an example of variations of the IC element cover will be described with reference to FIG. 17 to FIG. 24.

Figure 17:
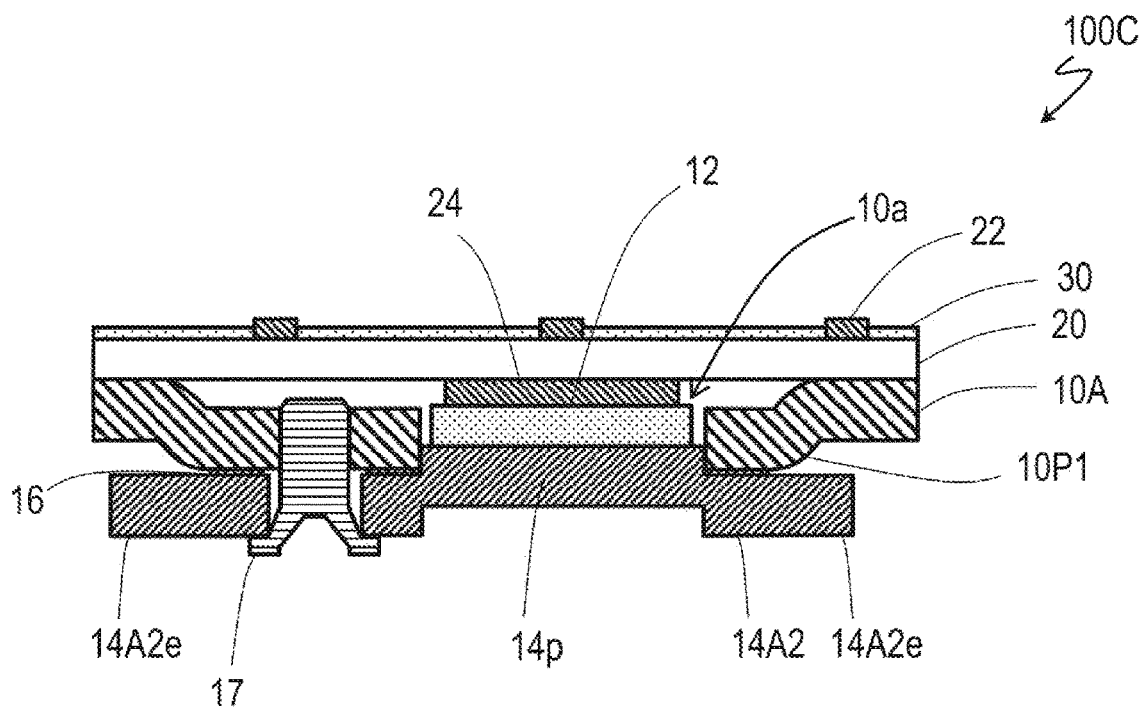
FIG. 17 is a schematic cross-sectional view of a portion including the IC element 24 of a backlight unit 100C according to an embodiment of the disclosure.
Figure 18:
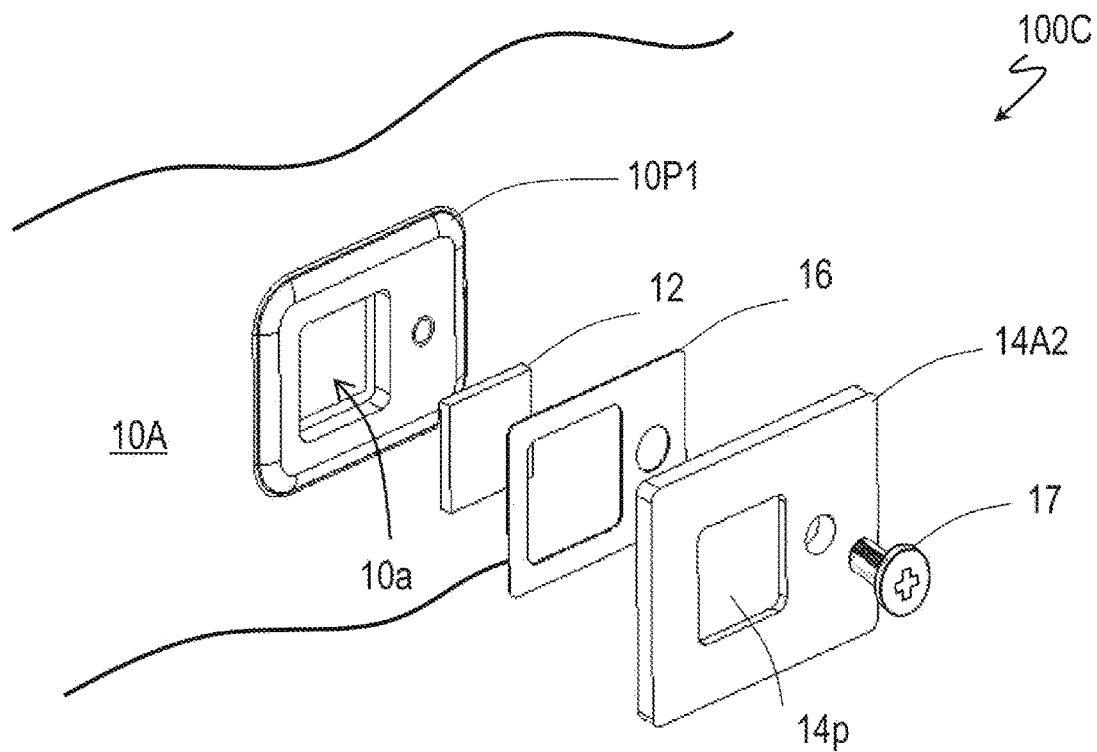
FIG. 18 is a schematic exploded perspective view of a portion including the protrusion 10P1 of the chassis 10A of the backlight unit 100C.

First, an IC element cover 14A2 included in another backlight unit 100C according to the embodiment of the disclosure will be described with reference to FIG. 17 and FIG. 18. FIG. 17 is a schematic cross-sectional view of a portion including the IC element 24 of the backlight unit 100C, and FIG. 18 is a schematic exploded perspective view of a portion including the protrusion 10P1 of the chassis 10A of the backlight unit 100C. The backlight unit 100C may be substantially the same as the backlight unit 100A illustrated in FIG. 6 except for the IC element cover 14A2, and thus constituent elements having substantially the same functions are denoted by the same reference signs and description will be omitted.

The IC element cover 14A2 included in the backlight unit 100C includes an extending portion 14A2e around the IC element cover 14A1 included in the backlight unit 100A. In other words, the IC element cover 14A2 has a surface area greater than that of the IC element cover 14A1, and has an excellent heat radiation property.

Figure 19:
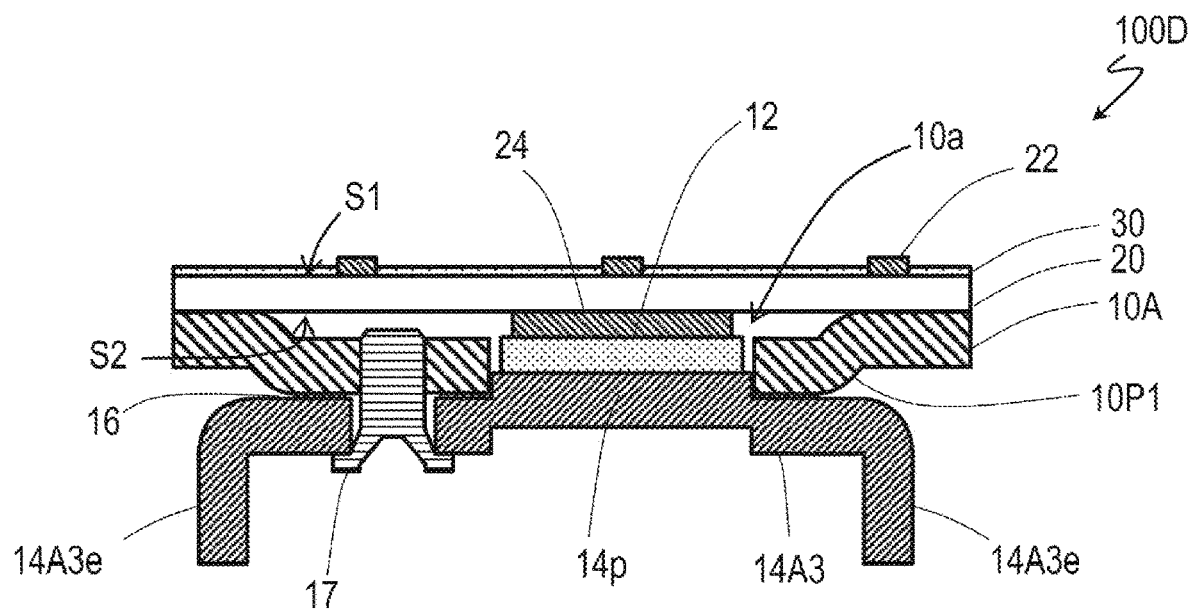
FIG. 19 is a schematic cross-sectional view of a portion including the IC element 24 of a backlight unit 100D according to an embodiment of the disclosure.
Figure 20:
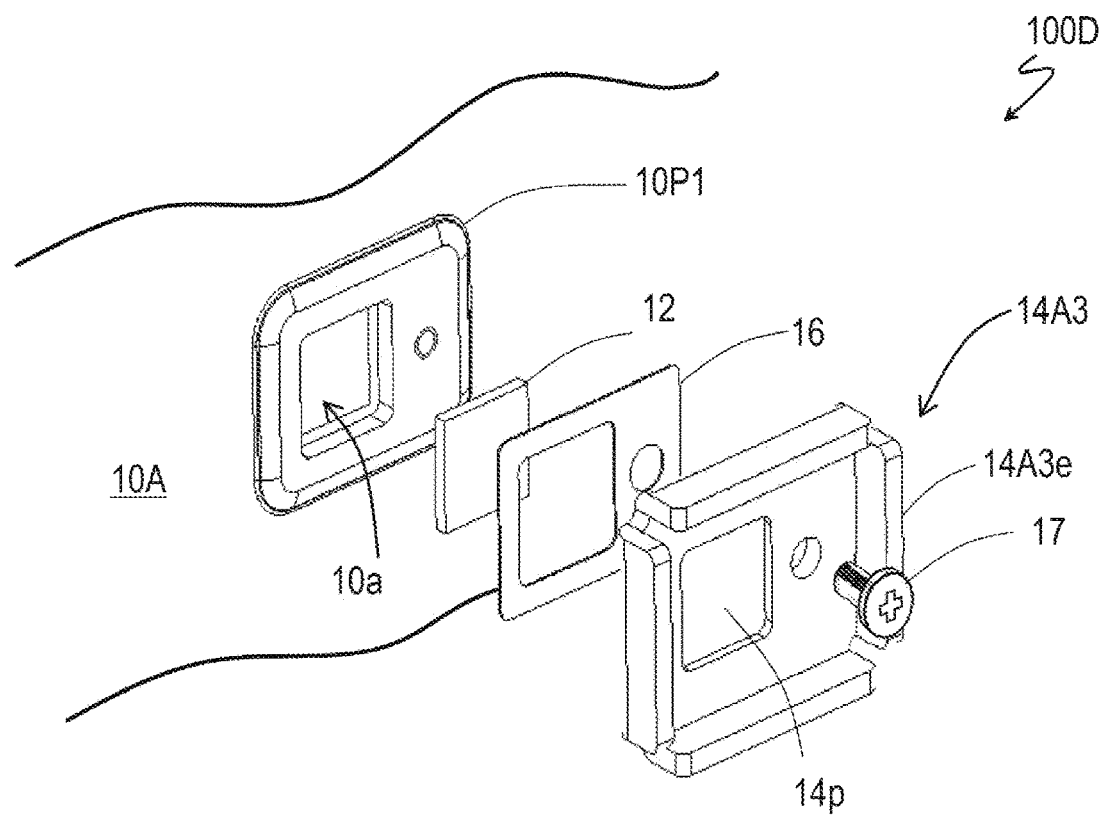
FIG. 20 is a schematic exploded perspective view of a portion including the protrusion 10P1 of the chassis 10A of the backlight unit 100D.

Next, an IC element cover 14A3 included in another backlight unit 100D according to the embodiment of the disclosure will be described with reference to FIG. 19 and FIG. 20. FIG. 19 is a schematic cross-sectional view of a portion including the IC element 24 of the backlight unit 100D, and FIG. 20 is a schematic exploded perspective view of a portion including the protrusion 10P1 of the chassis 10A of the backlight unit 100D. The backlight unit 100D may be substantially the same as the backlight unit 100A illustrated in FIG. 6 except for the IC element cover 14A3.

The IC element cover 14A3 included in the backlight unit 100D includes an extending portion 14A3e extending in a direction substantially perpendicular to the second main surface S2 around the IC element cover 14A1 included in the backlight unit 100A. For example, a thickness of the extending portion 14A3e is the same as a thickness of the IC element cover 14A1, and a length of the extending portion 14A3e is greater than the thickness of the IC element cover 14A1. In other words, the IC element cover 14A3 has a surface area greater than that of the IC element cover 14A1 and further greater than that of the IC element cover 14A2, and thus has a more excellent heat radiation property.

Figure 21:
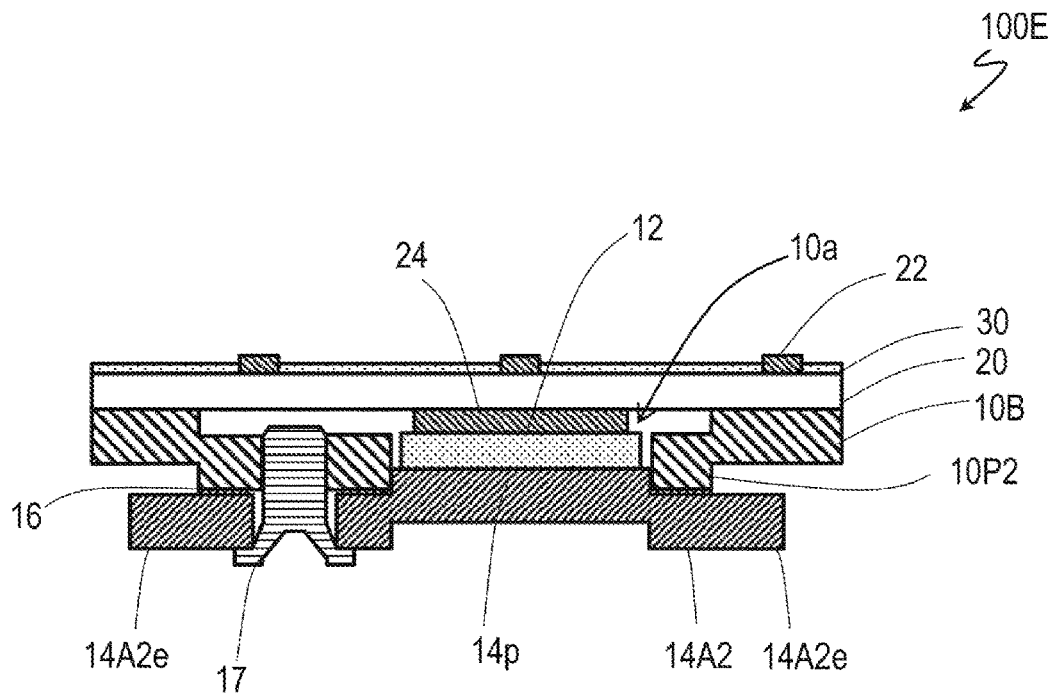
FIG. 21 is a schematic cross-sectional view of a portion including the IC element 24 of a backlight unit 100E according to an embodiment of the disclosure.
Figure 22:
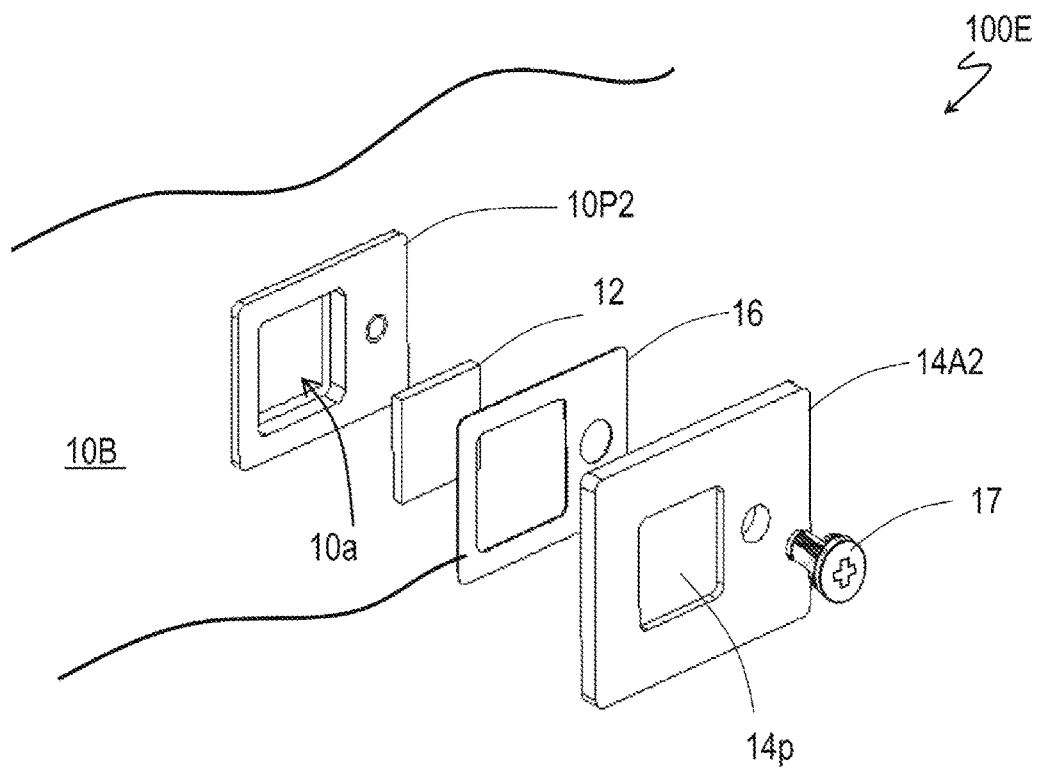
FIG. 22 is a schematic exploded perspective view of a portion including the protrusion 10P2 of the chassis 10B of the backlight unit 100E.
Figure 23:
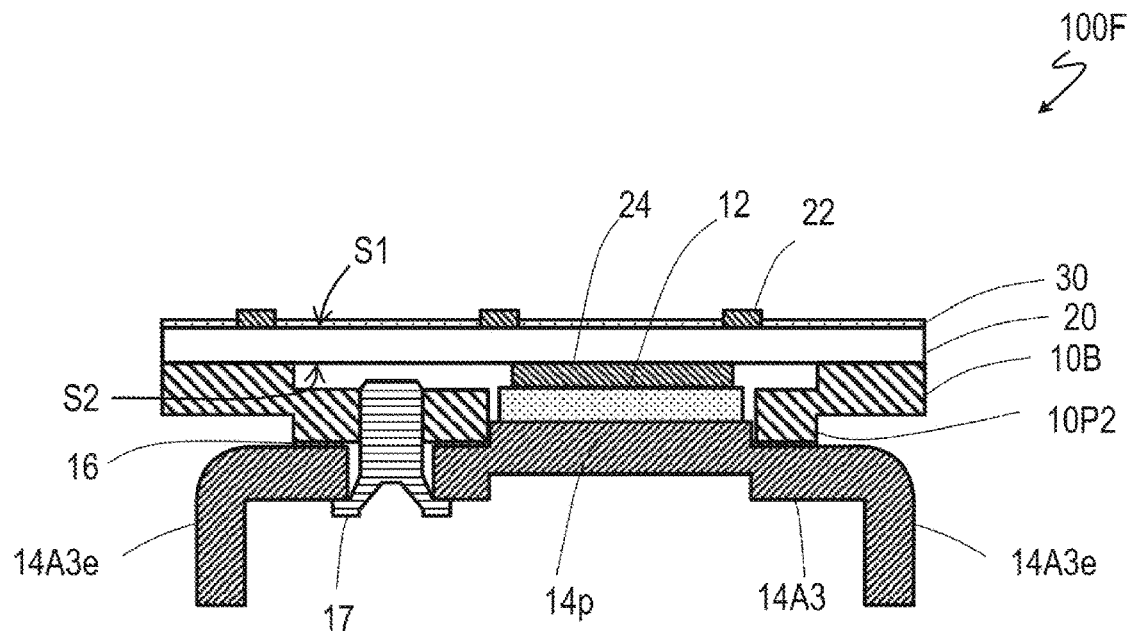
FIG. 23 is a schematic cross-sectional view of a portion including the IC element 24 of a backlight unit 100F according to an embodiment of the disclosure.
Figure 24:
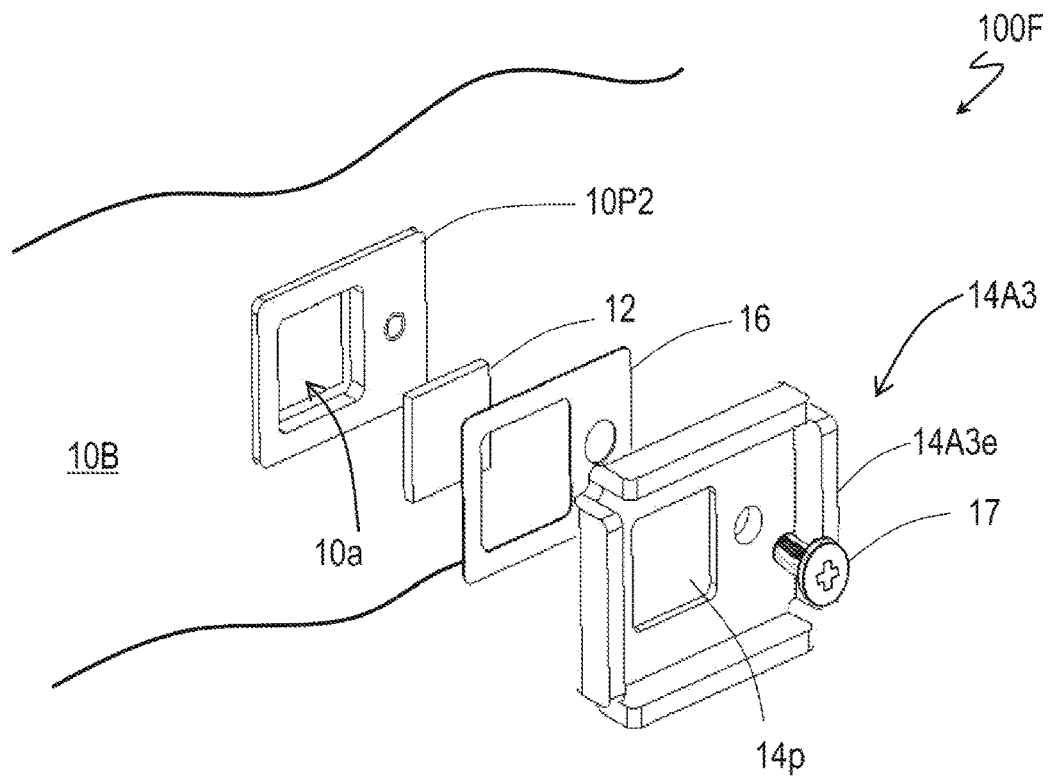
FIG. 24 is a schematic exploded perspective view of a portion including the protrusion 10P2 of the chassis 10B of the backlight unit 100F.

Next, other backlight units 100E and 100F according to the embodiments of the disclosure will be described with reference to FIG. 21, FIG. 22, FIG. 23, and FIG. 24. FIG. 21 is a schematic cross-sectional view of a portion including the IC element 24 of the backlight unit 100E, and FIG. 22 is a schematic exploded perspective view of a portion including the protrusion 10P2 of the chassis 10B of the backlight unit 100E. FIG. 23 is a schematic cross-sectional view of a portion including the IC element 24 of the backlight unit 100F, and FIG. 24 is a schematic exploded perspective view of a portion including the protrusion 10P2 of the chassis 10B of the backlight unit 100F. The backlight unit 100E illustrated in FIG. 21 and FIG. 22 may be the same as the backlight unit 100B illustrated in FIG. 8 except for the IC element cover 14A2, and the backlight unit 100F illustrated in FIG. 23 and FIG. 24 may be the same as the backlight unit 100B illustrated in FIG. 8 except for the IC element cover 14A3. The backlight units 100E and 100F include the IC element cover 14A2 (see FIG. 21) and the IC element cover 14A3 (see FIG. 23), respectively, and thus have excellent heat radiation characteristics as described above.

The IC element covers 14A2 and 14A3 may be formed by, for example, performing press working on an aluminum plate, and thus have excellent mass productivity, also have a low cost, and are easy to attach compared to a heat sink.

Figure 25:
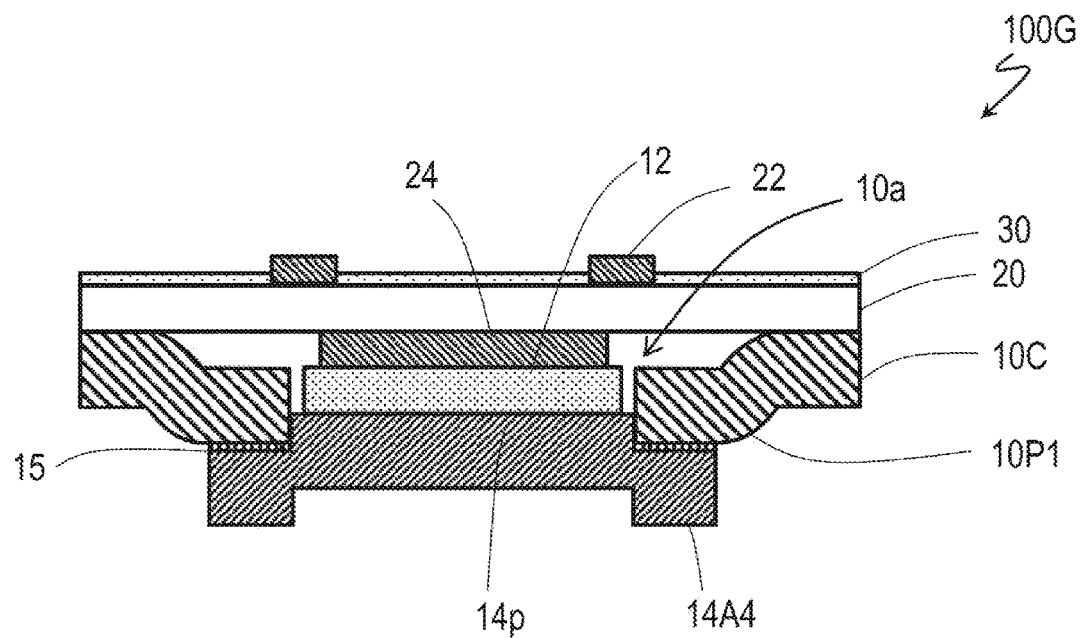
FIG. 25 is a schematic cross-sectional view of a portion including the IC element 24 of a backlight unit 100G according to an embodiment of the disclosure.
Figure 26:
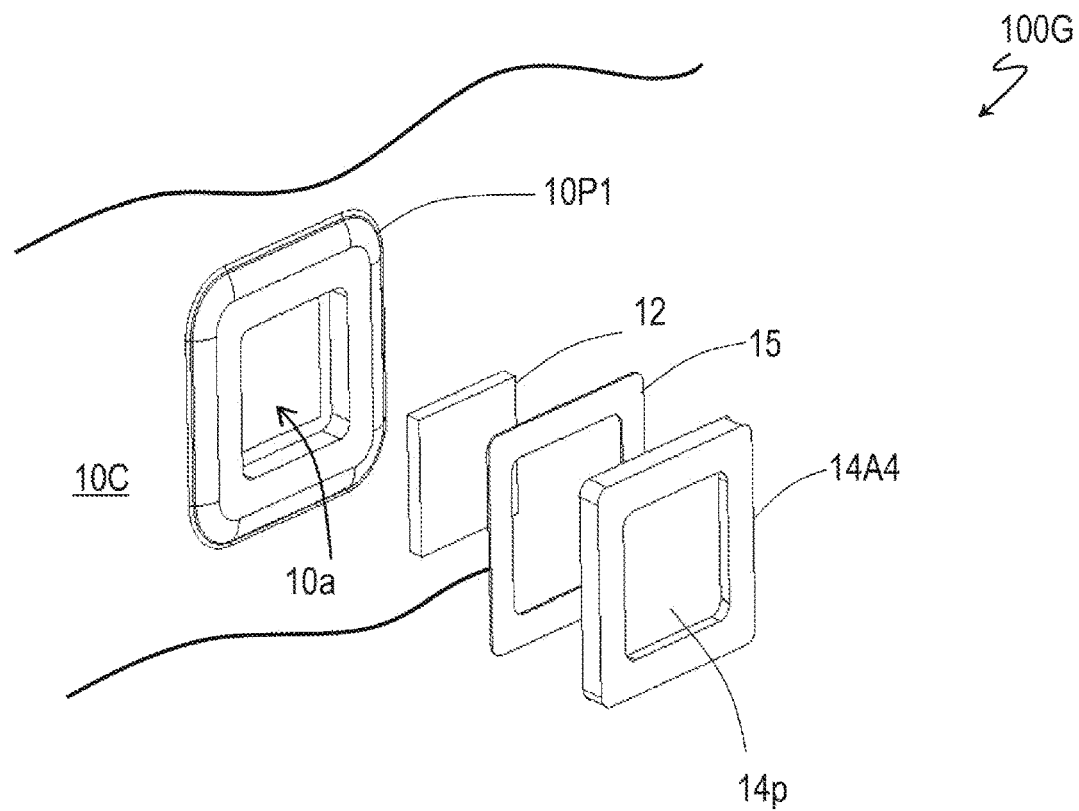
FIG. 26 is a schematic exploded perspective view of a portion including the protrusion 10P1 of a chassis 10C of the backlight unit 100G.
Figure 27:
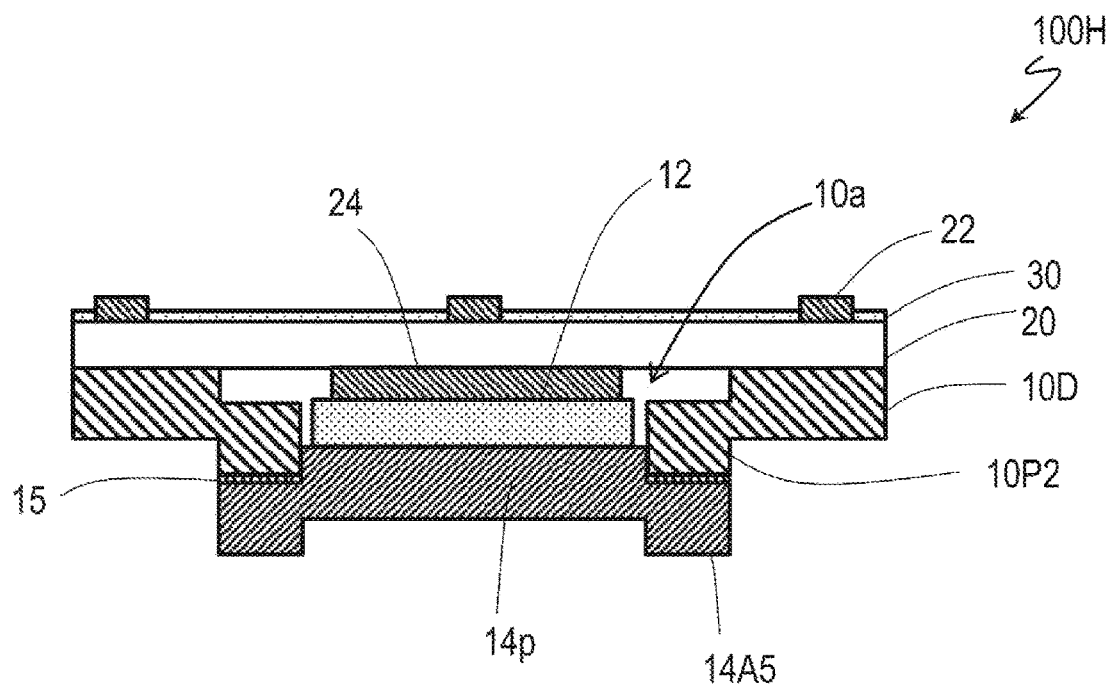
FIG. 27 is a schematic cross-sectional view of a portion including the IC element 24 of a backlight unit 100H according to an embodiment of the disclosure.
Figure 28:
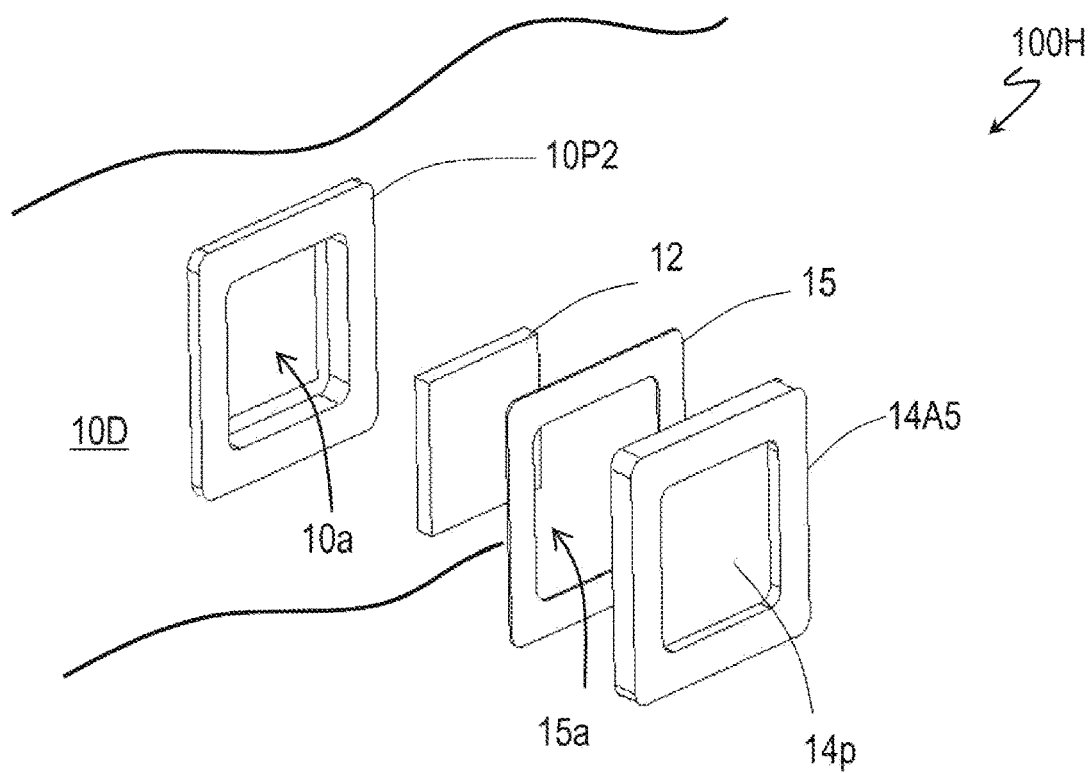
FIG. 28 is a schematic exploded perspective view of a portion including the protrusion 10P2 of a chassis 10D of the backlight unit 100H.

Next, other backlight units 100G and 100H according to the embodiments of the disclosure will be described with reference to FIG. 25, FIG. 26, FIG. 27, and FIG. 28. FIG. 25 is a schematic cross-sectional view of a portion including the IC element 24 of the backlight unit 100G, and FIG. 26 is a schematic exploded perspective view of a portion including the protrusion 10P1 of a chassis 10C of the backlight unit 100G. FIG. 27 is a schematic cross-sectional view of a portion including the IC element 24 of the backlight unit 100H, and FIG. 28 is a schematic exploded perspective view of a portion including the protrusion 10P2 of a chassis 10D of the backlight unit 100H.

The backlight units 100G and 100H use an adhesive layer 15 instead of the structure in which the IC element cover 14A1 is fixed by a screw in the backlight unit 100A illustrated in FIG. 6 and the backlight unit 100B illustrated in FIG. 8, respectively. The adhesive layer 15 is, for example, double-sided tape. The adhesive layer 15 also functions as a heat insulation sheet in the backlight unit 100A and the backlight unit 100B. The chassis 10C and an IC element cover 14A4 included in the backlight unit 100G, and the chassis 10D and an IC element cover 14A5 included in the backlight unit 100H do not have holes for a screw, and thus a structure for fixing the IC element covers 14A4 and 14A5 can be reduced in size. When a configuration using the adhesive layer 15 is adopted, an effect of reducing a cost is also acquired.

Figure 29:
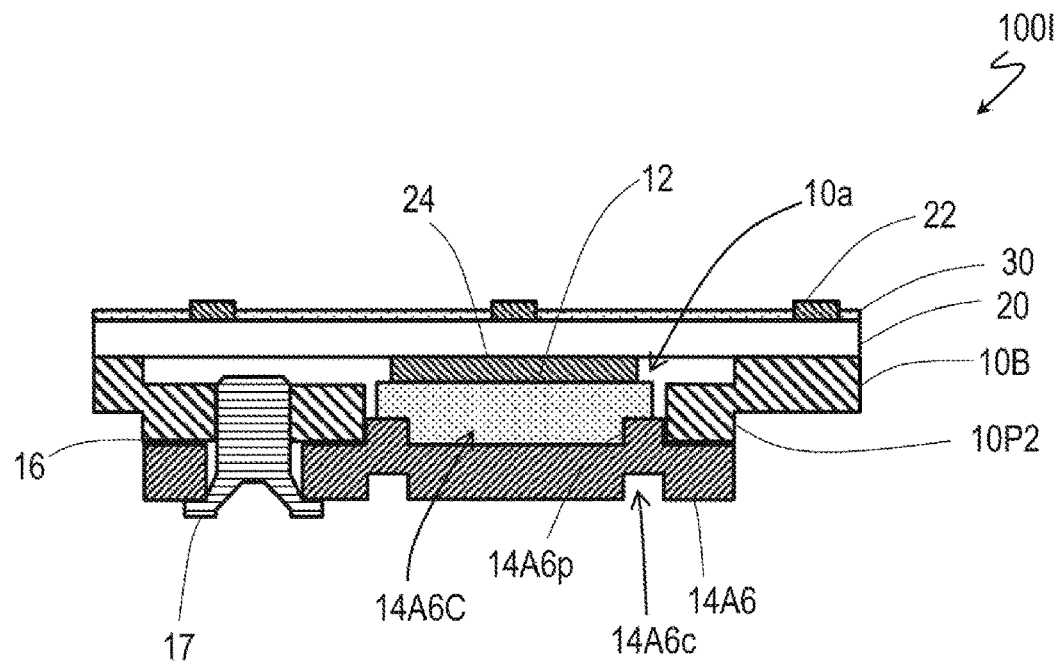
FIG. 29 is a schematic cross-sectional view of a portion including the IC element 24 of a backlight unit 100I according to an embodiment of the disclosure.
Figure 30:
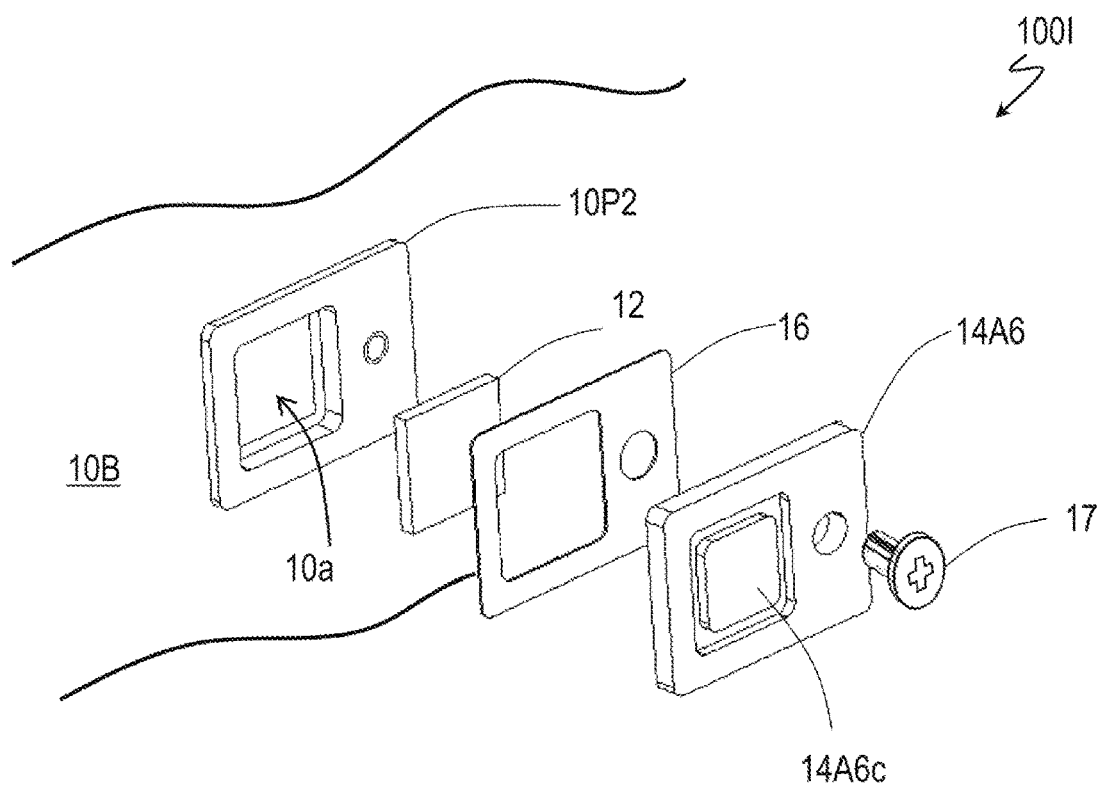
FIG. 30 is a schematic exploded perspective view of a portion including the protrusion 10P2 of the chassis 10B of the backlight unit 100I.

Next, another backlight unit 100I according to the embodiment of the disclosure will be described with reference to FIG. 29 and FIG. 30. FIG. 29 is a schematic cross-sectional view of a portion including the IC element 24 of the backlight unit 100I, and FIG. 30 is a schematic exploded perspective view of a portion including the protrusion 10P2 of the chassis 10B of the backlight unit 100I. The backlight unit 100I may be substantially the same as the backlight unit 100B illustrated in FIG. 8 except for an IC element cover 14A6.

The IC element cover 14A6 included in the backlight unit 100I includes a protruding portion 14A6p having a hollow square shape unlike the rectangular protruding portion 14p of the IC element cover 14A1 included in the backlight unit 100B. An outer circumferential surface of the protruding portion 14A6p fits in the opening 10a of the protrusion 10P2 of the chassis 10B. By including the protruding portion 14A6p having the hollow square shape, a recessed portion 14A6C is formed, and a space can be increased in a thickness direction more than with the rectangular protruding portion 14p. Note that a recessed portion 14A6c formed on a side opposite to the protruding portion 14A6p may be concomitantly formed when the protruding portion 14A6p is formed by press working, but is not needed as a structure.

Note that the heat radiation sheet 12 having a cross-sectional shape illustrated in FIG. 29 is acquired by squashing a heat radiation sheet having flexibility or by stacking two heat radiation sheets having different sizes, for example.

Figure 31:
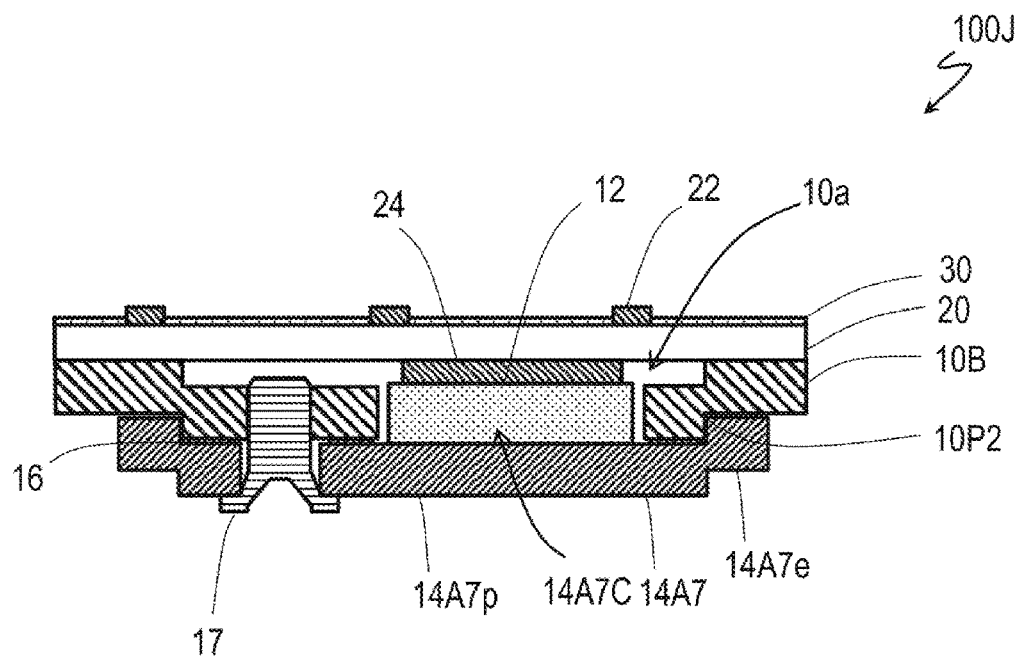
FIG. 31 is a schematic cross-sectional view of a portion including the IC element 24 of a backlight unit 100J according to an embodiment of the disclosure.
Figure 32:
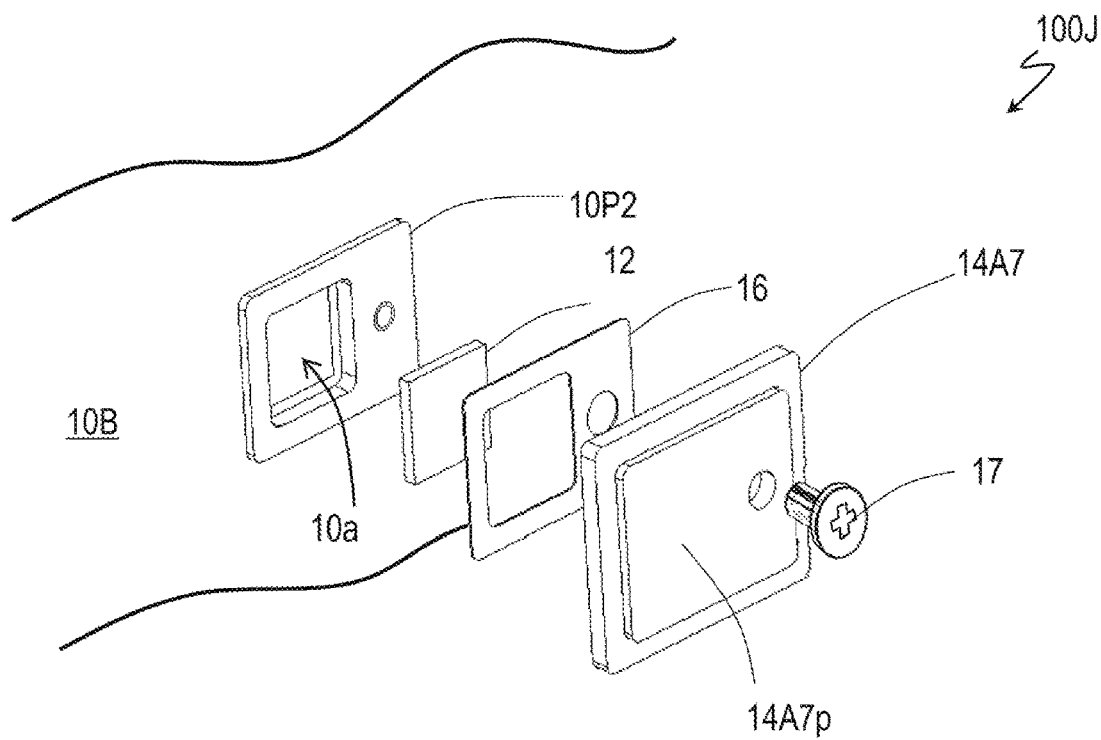
FIG. 32 is a schematic exploded perspective view of a portion including the protrusion 10P2 of the chassis 10B of the backlight unit 100J.

Next, another backlight unit 100J according to the embodiment of the disclosure will be described with reference to FIG. 31 and FIG. 32. FIG. 31 is a schematic cross-sectional view of a portion including the IC element 24 of the backlight unit 100J, and FIG. 32 is a schematic exploded perspective view of a portion including the protrusion 10P2 of the chassis 10B of the backlight unit 100J. The backlight unit 100J may be substantially the same as the backlight unit 100B illustrated in FIG. 8 except for an IC element cover 14A7.

The IC element cover 14A7 included in the backlight unit 100J includes an extending portion 14A7e, and includes a recessed portion 14A7C into which the protrusion 10P2 of the chassis 10B fits. In other words, the IC element cover 14A7 includes a protruding portion 14A7p protruding in a direction opposite to that in the examples described above (the protruding portion 14p and the protruding portion 14A6p). By adopting such a structure, similarly to the backlight unit 100I, a space in the thickness direction can be increased. Note that the heat radiation sheet 12 is modified so as to have a thickness allowing the heat radiation sheet 12 to be in contact with the IC element cover 14A7 and the IC element 24.

Figure 33:
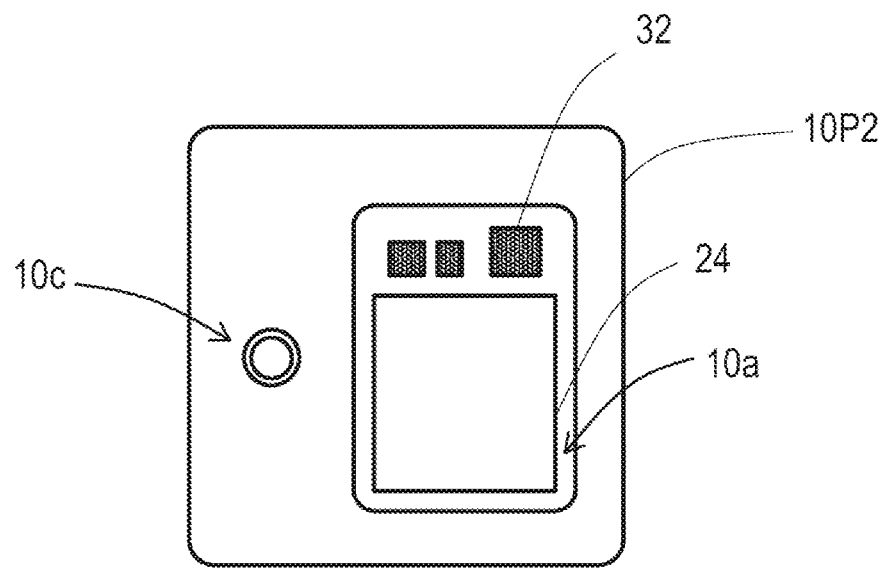
FIG. 33 is a schematic plan view illustrating an example in which the IC element 24 and an electronic component 32 are disposed in an opening 10a of the protrusion 10P2.
Figure 34:
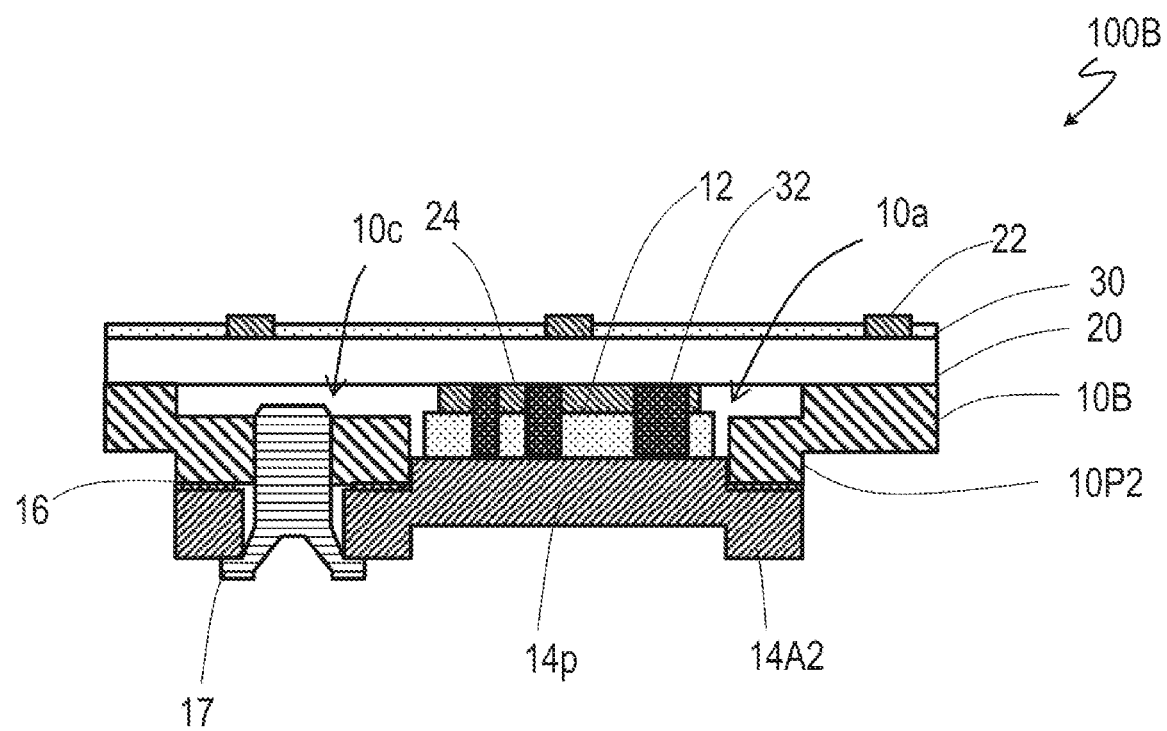
FIG. 34 is a schematic cross-sectional view when the backlight unit 100B includes the electronic component 32 near the IC element 24.
Figure 35A:
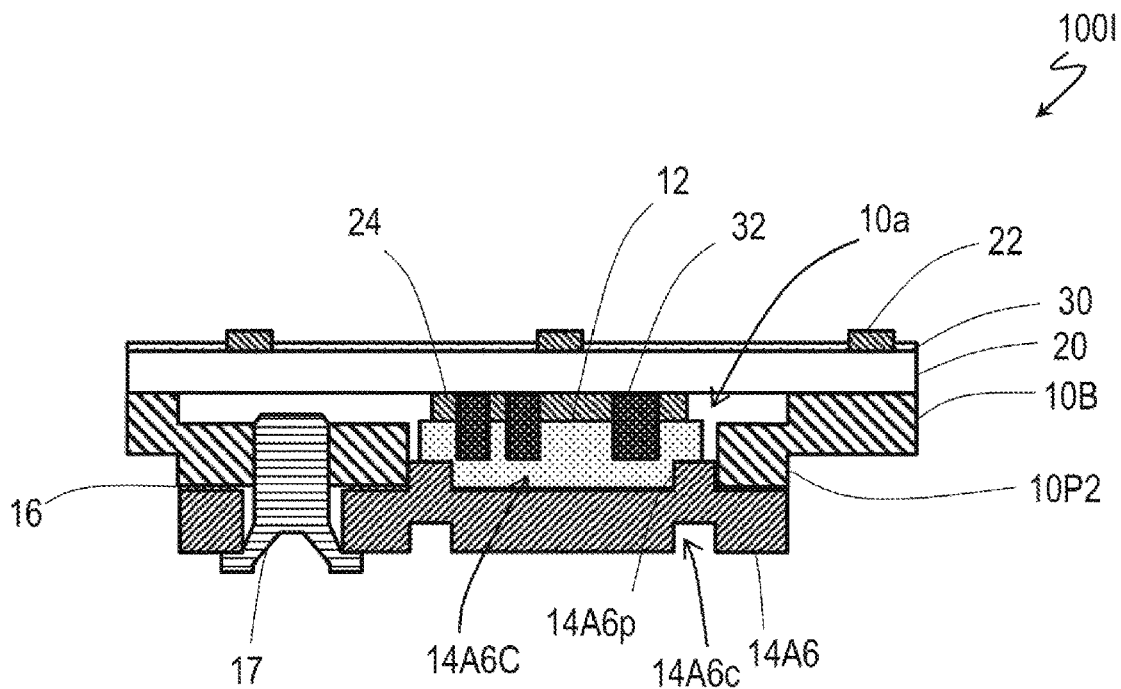
FIG. 35A is a schematic cross-sectional view (in a left-right direction) when the backlight unit 100I includes the electronic component 32 near the IC element 24.
Figure 35B:
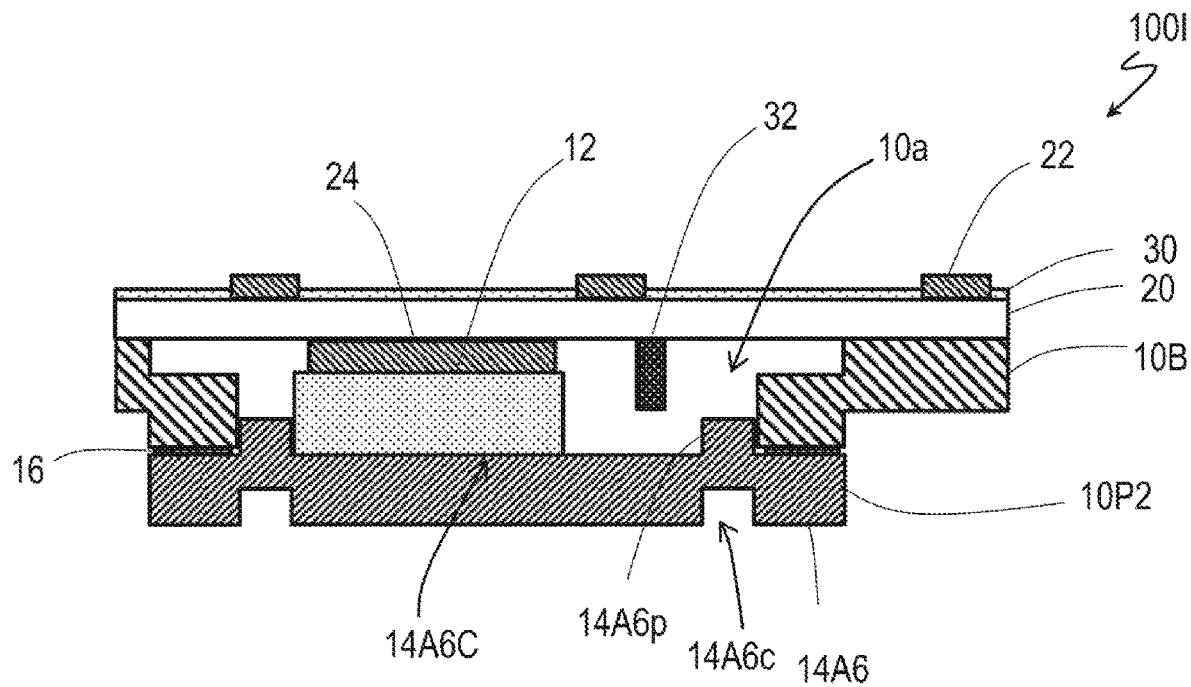
FIG. 35B is a schematic cross-sectional view (in a vertical direction) when the backlight unit 100I includes the electronic component 32 near the IC element 24.
Figure 36:
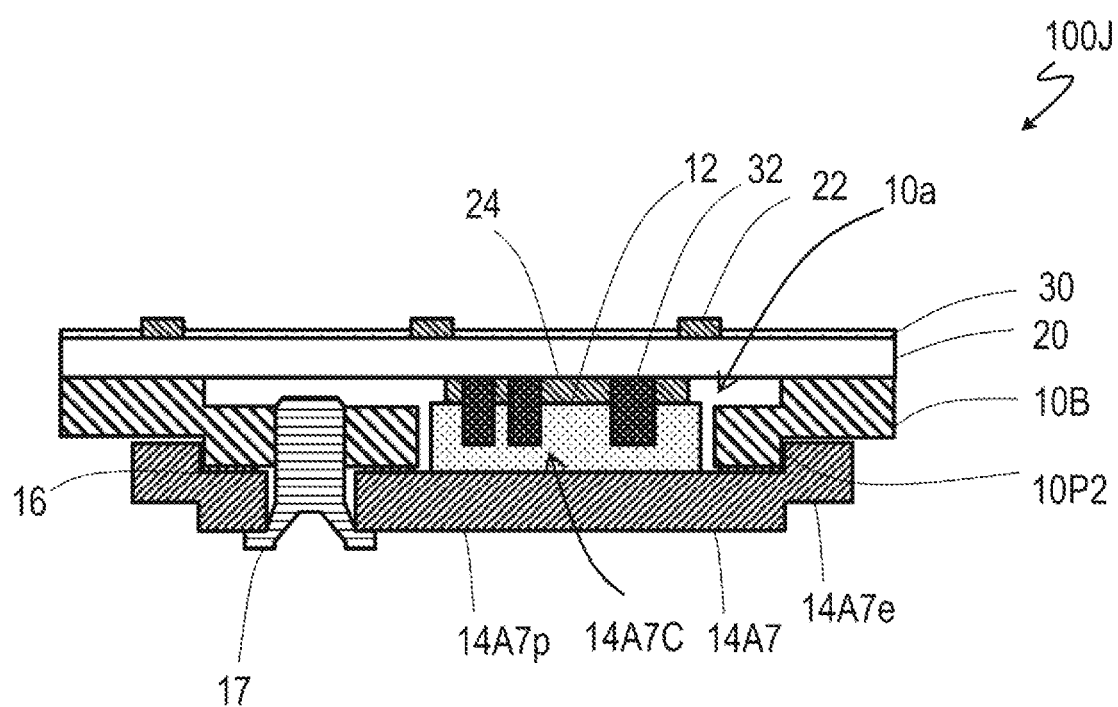
FIG. 36 is a schematic cross-sectional view when the backlight unit 100J includes the electronic component 32 near the IC element 24.

An advantage of the backlight units 100I and 100J will be described with reference to FIG. 33, FIG. 34, FIG. 35A, FIG. 35B, and FIG. 36. FIG. 33 is a schematic plan view illustrating an example in which the IC element 24 and an electronic component 32 are disposed in the opening 10a of the protrusion 10P2. FIG. 34 is a schematic cross-sectional view when the backlight unit 100B described above includes the electronic component 32 near the IC element 24, FIG. 35A and FIG. 35B are schematic cross-sectional views when the backlight unit 100I includes the electronic component 32 near the IC element 24, FIG. 35A is a cross-sectional view in a left-right direction, and FIG. 35B is a cross-sectional view in a vertical direction. FIG. 36 is a schematic cross-sectional view when the backlight unit 100J includes the electronic component 32 near the IC element 24. Note that, in FIG. 34, FIG. 35A, and FIG. 36, the electronic component 32 is superimposed on the cross-sectional view.

As illustrated in FIG. 33, the electronic component (for example, a capacitor or a resistor) 32 may be disposed near the IC element 24. A height of the electronic component 32 (a length in the normal direction of the second main surface S2) may be higher than that of the IC element 24. Then, for example, as illustrated in FIG. 34, the electronic component 32 may not be able to be housed in a configuration of the backlight unit 100B. At this time, when the protrusion 10P1 is formed by, for example, drawing processing as in the backlight unit 100A, a space having a sufficient height can be ensured. However, as described above, the protrusion 10P1 formed by drawing processing is larger than the protrusion 10P2 formed by half-punch processing (a projection area when viewed from the normal direction of the second main surface S2 is larger). Thus, as illustrated in FIG. 35A, FIG. 35B, and FIG. 36, when a configuration as in the backlight units 100I and 100J is adopted, a space having a sufficient height to house the electronic component 32 can be ensured.

In the backlight units 100I and 100J, in order to ensure a space having a sufficient height to house the IC element 24 and the electronic component 32, the recessed portions 14A6C and 14A7C are formed, respectively. In contrast, as in a backlight unit 100K illustrated in FIG. 37 and FIG. 38, only a height of a space for housing the electronic component 32 may be increased.

Figure 37:
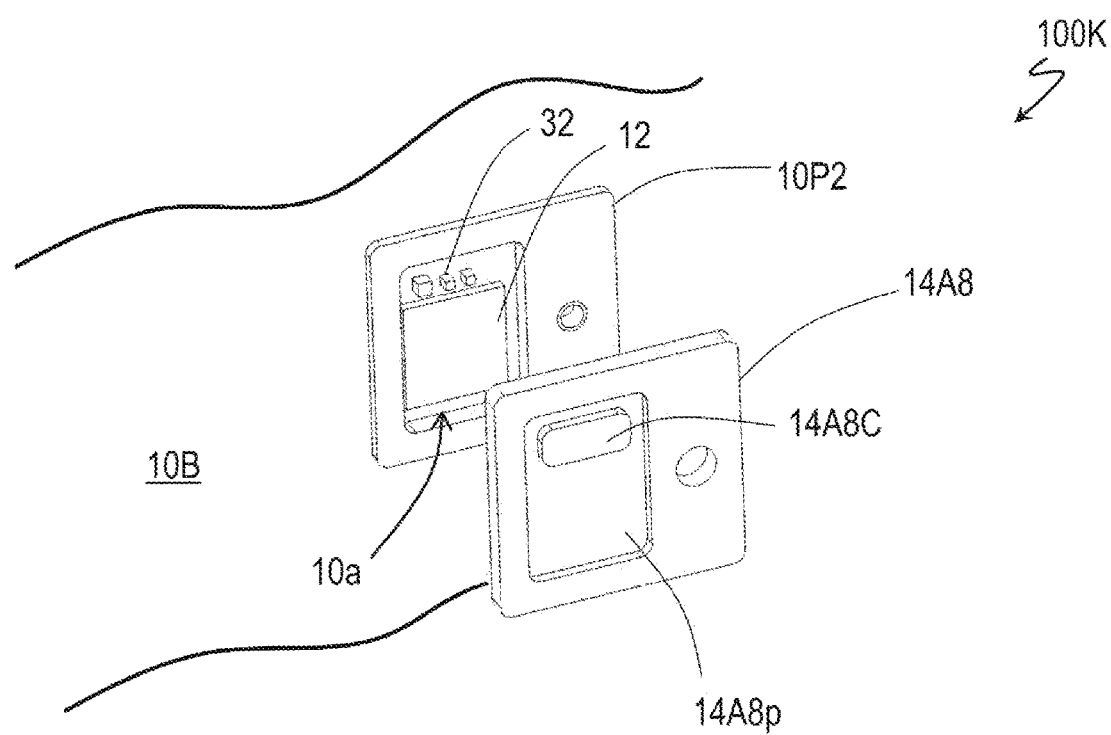
FIG. 37 is a schematic exploded perspective view of a portion including the protrusion 10P2 of the chassis 10B of a backlight unit 100K according to an embodiment of the disclosure.
Figure 38:
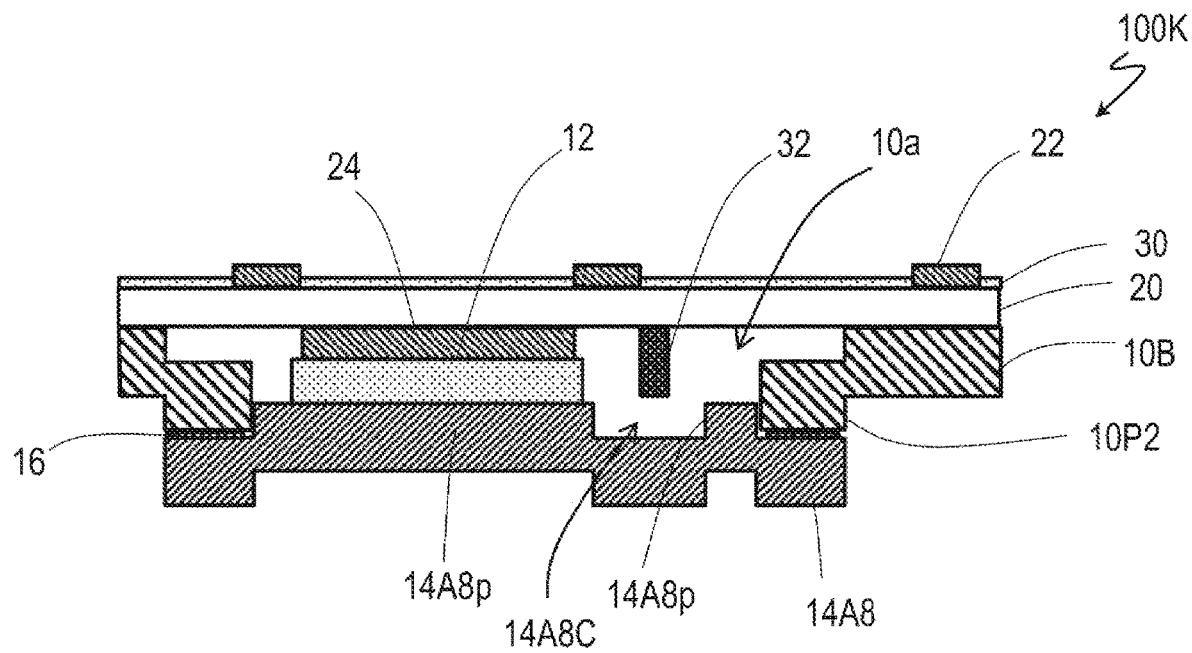
FIG. 38 is a schematic cross-sectional view of a portion including the IC element 24 and the electronic component 32 of the backlight unit 100K.

FIG. 37 is a schematic exploded perspective view of a portion including the protrusion 10P2 of the chassis 10B of the backlight unit 100K, and also illustrates the IC element 24 and the electronic component 32 exposed in the opening 10a. FIG. 38 is a schematic cross-sectional view of a portion including the IC element 24 and the electronic component 32 of the backlight unit 100K, and is a cross-sectional view in the vertical direction in FIG. 37.

An IC element cover 14A8 includes a protruding portion 14A8p that fits into the opening 10a of the chassis 10B. The protruding portion 14A8p includes a recessed portion 14A8C in a position facing the electronic component 32, and secures a space having a sufficient height to house the electronic component 32.

The configurations of the backlight units according to the embodiments of the disclosure described above may be combined, replaced, or modified as necessary. The backlight units according to the embodiments of the disclosure have a DOB configuration, and can efficiently cool a drive IC element while reducing entry of dust and light leakage. The backlight units according to the embodiments of the disclosure can be suitably used in a display device including a transmission-type display panel such as a liquid crystal display panel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A backlight unit comprising:
   an LED substrate including a first main surface and a second main surface on a side opposite to the first main surface;
   a plurality of LED elements arranged on the first main surface;
   one or more drive IC elements arranged on the second main surface;
   a chassis disposed on the second main surface side of the LED substrate; and
   one or more IC element covers each being in direct or indirect contact with a corresponding drive IC element of the one or more drive IC elements,
   wherein the chassis includes one or more protrusions respectively corresponding to the one or more drive IC elements,
   each of the one or more protrusions includes an opening exposing the corresponding drive IC element when viewed from a normal direction of the second main surface, and
   the IC element cover fits in the protrusion.

2. The backlight unit according to claim 1,
   wherein the IC element cover includes a recessed portion into which the protrusion fits.

3. The backlight unit according to claim 1,
   wherein the IC element cover includes a protruding portion fitting into the opening included in the protrusion.

4. The backlight unit according to claim 3,
   wherein the protruding portion has a hollow square shape when viewed from the normal direction of the second main surface.

5. The backlight unit according to claim 3,
wherein the protruding portion has a substantially rectangular shape when viewed from the normal direction of the second main surface.
6. The backlight unit according to claim 1,
wherein the IC element cover is larger than the protrusion when viewed from the normal direction of the second main surface.
7. The backlight unit according to claim 1,
wherein the IC element cover includes an extending portion extending in a direction substantially perpendicular to the second main surface.
8. The backlight unit according to claim 1, further comprising
a heat radiation sheet disposed between the drive IC element and the IC element cover.
9. The backlight unit according to claim 1, further comprising
a heat insulation sheet disposed between the chassis and the IC element cover.
10. The backlight unit according to claim 9,
wherein the heat insulation sheet is a double-sided adhesive sheet.
11. The backlight unit according to claim 1,
wherein the chassis and the IC element cover are fixed to each other by a screw.
12. The backlight unit according to claim 1,
wherein the protrusion is formed by drawing processing.
13. The backlight unit according to claim 1,
wherein the protrusion is formed by half-punch processing.
14. The backlight unit according to claim 3,
wherein the protruding portion is formed by half-punch processing.
15. A display device comprising:
the backlight unit according to claim 1; and
a display panel disposed on the first main surface side of the LED substrate.

* * * * *